(12) United States Patent
Sekiguchi

(10) Patent No.: US 8,712,817 B2
(45) Date of Patent: Apr. 29, 2014

(54) PROCESS INFORMATION STRUCTURING SUPPORT METHOD

(75) Inventor: Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 12/351,634

(22) Filed: Jan. 9, 2009

(65) Prior Publication Data
US 2009/0248733 A1  Oct. 1, 2009

(30) Foreign Application Priority Data

Mar. 27, 2008  (JP) .................................. 2008-082717

(51) Int. Cl.
*G06Q 10/00* (2012.01)

(52) U.S. Cl.
CPC ...................................... *C06Q 10/06* (2013.01)
USPC ........................... 705/7.13; 707/803; 717/104

(58) Field of Classification Search
CPC . G06Q 10/06; G06Q 10/0633; G06Q 10/103; G06Q 10/06316; G06Q 10/067
USPC ............................ 707/803; 717/104; 705/7.13
See application file for complete search history.

(56) References Cited

U.S. PATENT DOCUMENTS

| | | | |
|---|---|---|---|
| 2002/0194275 A1 | 12/2002 | Sakimura et al. | |
| 2003/0083910 A1* | 5/2003 | Sayal et al. ........................ | 705/7 |
| 2005/0076059 A1 | 4/2005 | Nomura et al. | |
| 2005/0080639 A1* | 4/2005 | Tang ................................. | 705/1 |
| 2006/0282241 A1* | 12/2006 | Liang et al. ........................ | 703/6 |
| 2007/0226222 A1 | 9/2007 | Yamamoto et al. | |
| 2007/0245297 A1* | 10/2007 | Kuester et al. ................. | 717/104 |
| 2007/0265895 A1* | 11/2007 | Moore ............................... | 705/7 |
| 2008/0021867 A1 | 1/2008 | Nomura et al. | |
| 2008/0163159 A1* | 7/2008 | Oara et al. ...................... | 717/104 |
| 2008/0294485 A1* | 11/2008 | Takeuchi et al. .................. | 705/8 |
| 2008/0320486 A1* | 12/2008 | Bose et al. ..................... | 718/105 |
| 2009/0083110 A1* | 3/2009 | Markovic et al. ................. | 705/9 |

FOREIGN PATENT DOCUMENTS

| | | |
|---|---|---|
| JP | 08-320899 | 12/1996 |
| JP | 09-091339 | 4/1997 |
| JP | A 11-203119 | 7/1999 |
| JP | 2000-250872 | 9/2000 |

(Continued)

OTHER PUBLICATIONS

Notification of Reasons for Refusal mailed Sep. 25, 2012 for corresponding Japanese Patent Application No. 2008-082717 (with partial English translation).

(Continued)

*Primary Examiner* — Cheyne D Ly
(74) *Attorney, Agent, or Firm* — Greer Burn & Crain Ltd.

(57) ABSTRACT

A process information structuring support system includes a first acquisition part configured to acquire a process information showing a flow of a plurality of processing elements and containing a plurality of related elements associated with the plurality of processing elements respectively, a holding part configured to hold structured information obtained by structuring information about the plurality of related elements, a second acquisition part configured to acquire the structured information held by the holding part, a generation part configured to generate structured process information by structuring the plurality of processing elements in the process information acquired by the first acquisition part in accordance with the structured information acquired by the second acquisition part and an output part configured to output the structured process information generated by the generation part.

13 Claims, 28 Drawing Sheets

(56) References Cited

FOREIGN PATENT DOCUMENTS

| | | |
|---|---|---|
| JP | A 2003-6395 | 1/2003 |
| JP | 2004-234586 | 8/2004 |
| JP | A 2005-115494 | 4/2005 |
| JP | 2007-264768 | 10/2007 |
| JP | A 2008-27072 | 2/2008 |

OTHER PUBLICATIONS

Notification of Reasons for Refusal mailed Jun. 19, 2012 for corresponding Japanese Patent Application No. 2008-082717 (with partial English translation).

* cited by examiner

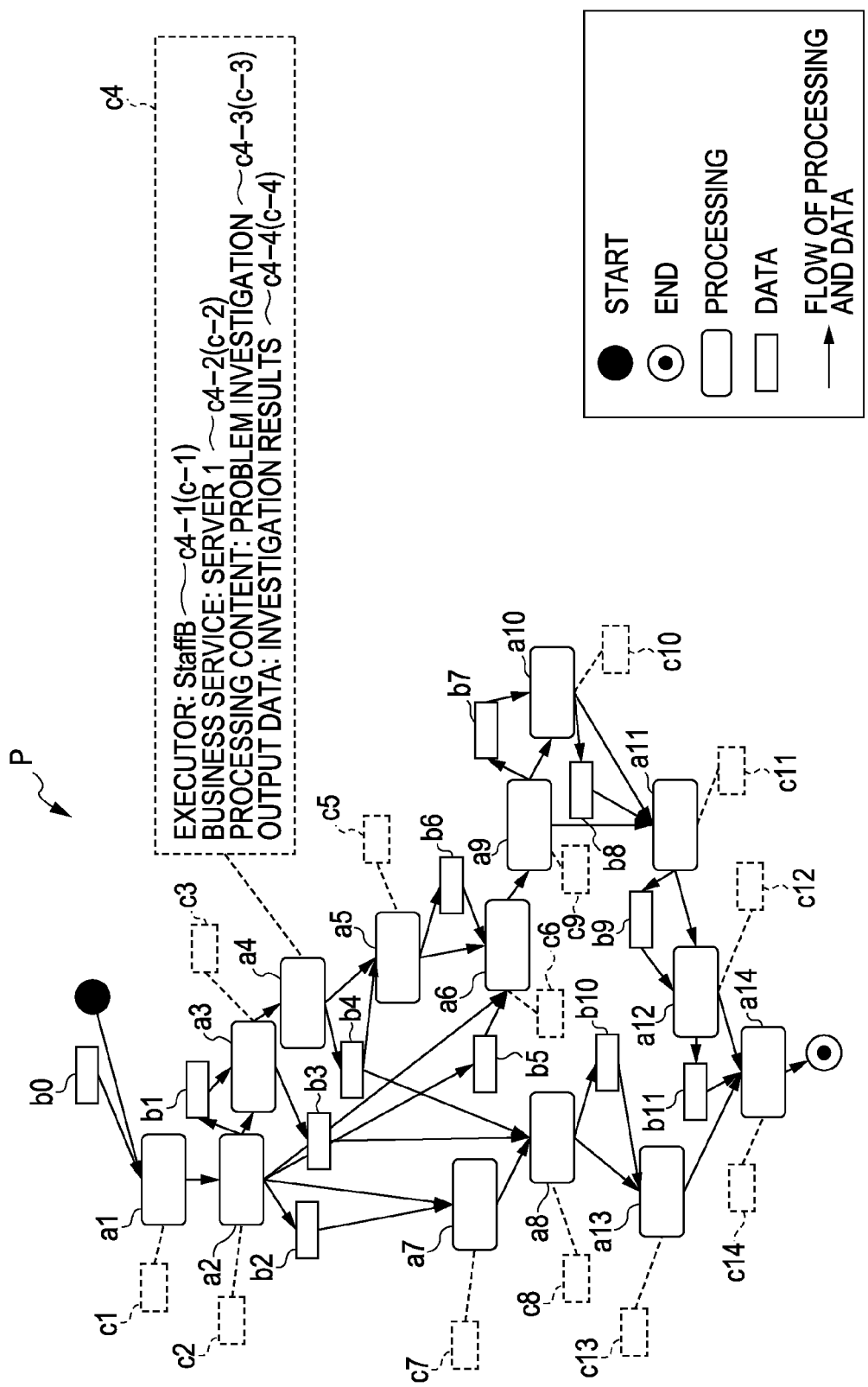

PROCESS INFORMATION STRUCTURING SUPPORT METHOD

CROSS-REFERENCE TO RELATED APPLICATION

This application is based upon and claims the benefit of priority of the prior Japanese Patent Application No. 2008-082717, filed on Mar. 27, 2008, the entire contents of which are incorporated herein by reference.

FIELD

The embodiments discussed herein are related to a technology to support generation of business processes, operation processes and the like showing the flow of a plurality of procedures and data in business process management (BPM).

BACKGROUND

Visualization of business processes, operation processes and the like in business process management (BPM) of an enterprise will be considered. Before the consideration, a business process and an operation process are defined as shown below:

Business process: a process to execute the core business of an enterprise that shows a structure and the flow of procedures and data to execute the core business.

Operation process: a process to support operation of a business process that shows a structure and the flow of procedures and data for daily operation of a business process such as operation management of an IT device.

Such business processes and operation processes (hereinafter, referred to as business/operation processes) may be described in a standard notation modeling language such as BPMN (Business Process Modeling Notation) and UML (Unified Modeling Language). Accordingly, all people involved in business can easily understand business/operation processes and visualization can be promoted. Here, people involved in business include business analysts who create/update processes, engineers who implement processes, and managers who manage processes.

On the other hand, existing business/operation processes created previously include those that are not described in the above standard notation modeling language. More specifically, business/operation processes whose existing documents do not have uniform forms, those whose existing documents are inconsistent with the current operation, and those whose know-how is not properly documented exist. Moreover, business/operation processes are sometimes designed by relying on know-how of individual persons in charge of design and in such cases, business/operation processes are frequently not documented.

If the amount of information of such existing business/operation processes is enormous, an enormous amount of manpower will be needed to promote visualization of business/operation processes.

SUMMARY

According to an aspect of an embodiment, a process information structuring support system includes a first acquisition part configured to acquire a process information showing a flow of a plurality of processing elements and containing a plurality of related elements associated with the plurality of processing elements respectively; a holding part configured to hold structured information obtained by structuring information about the plurality of related elements; a second acquisition part configured to acquire the structured information held by the holding part; a generation part configured to generate structured process information by structuring the plurality of processing elements in the process information acquired by the first acquisition part in accordance with the structured information acquired by the second acquisition part; and an output part configured to output the structured process information generated by the generation part.

BRIEF DESCRIPTION OF DRAWINGS

FIG. 2 is a diagram exemplarily showing an example of process information generated by a process information generation device in the process information structuring support system in the present embodiment;

DESCRIPTION OF EMBODIMENTS

Business/operation processes described from automatic extraction results obtained by automatic collection as described above (hereinafter, referred to as automatic extraction results) have a flat structure in which the flow of procedures and data extending over various persons in charge, departments, and services is not classified (divided). Thus, automatic extraction results are not structured, for example, like being classified into sets according to a suitable procedure.

When promoting visualization of business/operation processes, on the other hand, business/operation processes are required to be formed into a hierarchical structure like a WBS (Work Breakdown Structure).

Thus, when automatic extraction results according to a conventional technique should be formed into a hierarchical structure, persons in charge of process visualization need to manually classify automatic extraction results into sets according to a suitable procedure before forming a hierarchical structure. However, in such a case, problems as shown in (1) to (4) below arise:

(1) It is difficult to understand the structure.

(2) It is not easy to understand in what work some procedure is present as a portion thereof.

(3) Reviewing is not easy.

(4) Reviewing a procedure such as whether changing some procedure affects other procedures and whether work is replaceable by other work in some unit is not easy.

Therefore, the inventors assumed that when existing business/operation processes are formed into a hierarchical structure for visualization, persons in charge of process visualization need to manually do much work, requiring a vast amount of manpower.

The present embodiment will be described below with reference to drawings.

Before describing the present embodiment, definitions of terms in the present embodiment will be shown below.

A business process is a process to execute a core business of an enterprise that includes a structure and the flow of procedures and data to execute the core business.

An operation process is a process to support operation of a business process that includes a structure and the flow of procedures and data for daily operation of a business process such as operation management of an IT device.

[1] Description of the Present Embodiment

Figure 1:
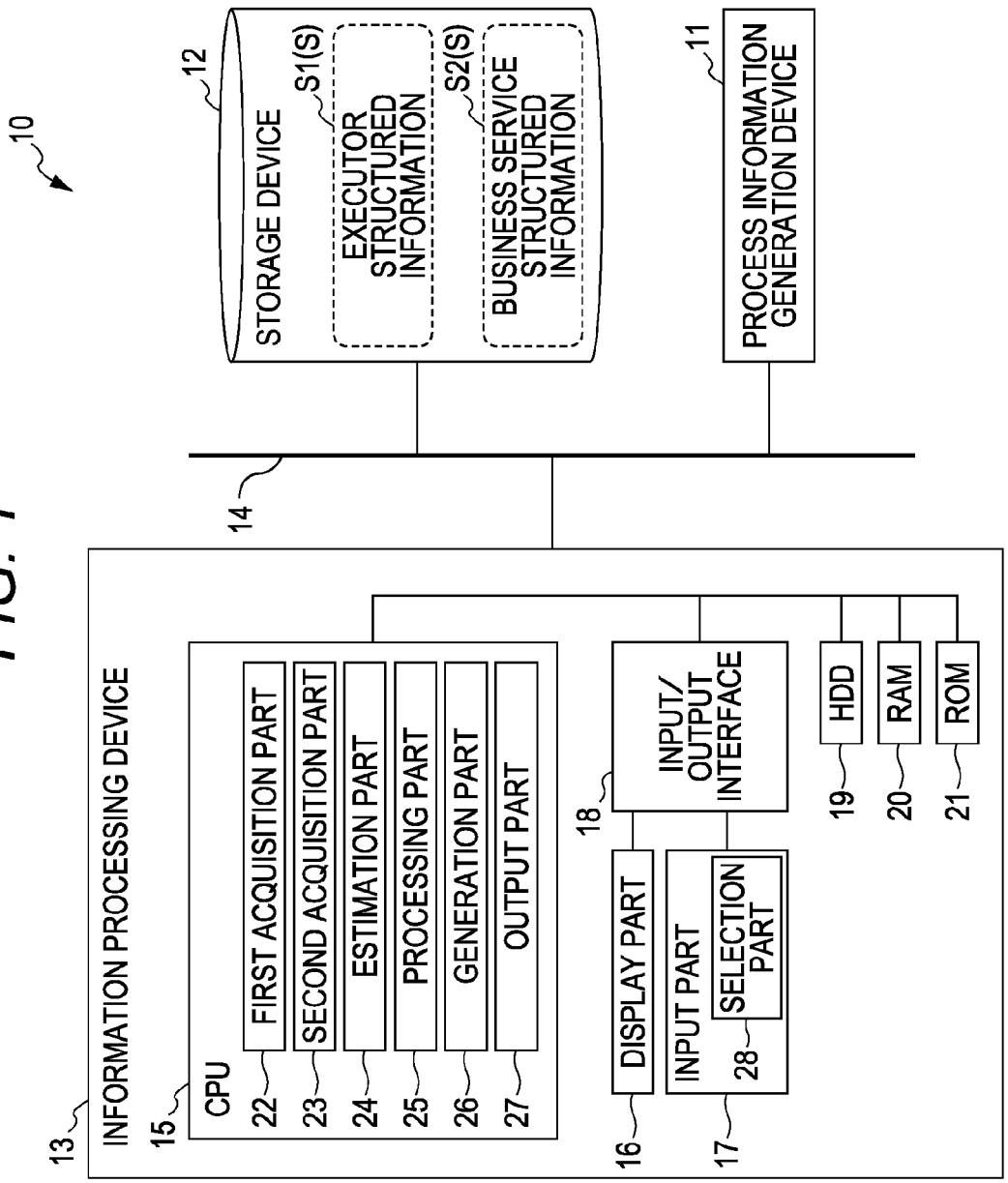
FIG. 1 is a diagram exemplarily showing a configuration example of a process information structuring support system in the present embodiment.

FIG. 1 is a diagram exemplarily showing a configuration example of a process information structuring support system 10 in the present embodiment.

The process information structuring support system 10 in the present embodiment is, as shown, for example, in FIG. 2, a system to support structuring of process information P, which is information of a business process, an operation process or the like.

The process information structuring support system 10 includes, as shown, for example, in FIG. 1, a process information generation device 11, a storage device (holding part) 12, and an information processing device (process information structuring support device) 13. The process information generation device 11, the storage device 12, and the information processing device 13 are connected to each other via a network 14 to be able to perform communication.

The process information generation device 11 is used to automatically generate the process information P.

As a technique to automatically generate process information, a known technology to automatically collect (automatically extract) necessary information from created processes (business/operation processes) such as Japanese Unexamined Patent Application Publication No. 2005-115494 and Japanese Unexamined Patent Application Publication No. 2008-27072 can be used.

FIG. 2 is a diagram exemplarily showing an example of the process information P generated by the process information generation device 11 in the process information structuring support system 10 in the present embodiment.

The process information P may be described in the standard notation modeling language such as BPMN (Business Process Modeling Notation) and UML (Unified Modeling Language) or may not be described in one of the above standard notation modeling languages. For example, the process information P not described in one of the above standard notation modeling languages includes information whose documents have no uniform forms, information whose existing documents are not consistent with current operation, and information in which know-how is not properly documented.

Processing elements indicate business operations (events) such as acceptance of an order, inventory inquiry, ordering, reception, shipment, and delivery.

The process information P generated by the process information generation device 11 includes, as shown, for example, in FIG. 2, a plurality of processing elements a1 to a14 and a plurality of data elements b0 to b11. The process information P shows not only the flow of the plurality of processing elements a1 to a14, but also the flow of each data element b0 to b11 exchanged among the processing elements a1 to a14. A detailed description of the data structure of each of the data elements b0 to b11 is omitted for convenience' sake.

The process information P generated by the process information generation device 11 has a flat structure in which the flow of procedures and data extending over various persons in charge, departments, and services is not classified (divided).

Then, the process information P has a plurality of related elements c1 to c14 associated with and attached to the plurality of processing elements a1 to a14 respectively. That is, the process information generation device 11 automatically generates the process information P containing the plurality of related elements c1 to c14 associated with the plurality of processing elements a1 to a14 respectively.

When it is necessary to identify one of the plurality of processing elements, the numerals a1 to a14 are used as numerals below to indicate processing elements, but the numeral a is used when any one or a plurality of processing elements is indicated.

Also, when it is necessary to identify one of the plurality of related elements, the numerals c1 to c14 are used as numerals below to indicate related elements, but the numeral c is used when any one or a plurality of related elements is indicated.

Here, a related element c indicates detailed information of an associated processing element a. The related element c has, for example, a plurality of types of related elements and, in the present embodiment, executor information (first related element) c-1 ("-" is a hyphen and this also applies below) related to the processing element a, business service information (second related element) c-2, processing content information c-3, and input/output data information c-4. That is, the related element c has the first related element c-1 and the second related element c-2.

In the example shown in FIG. 2, if the processing element a4 is focused on, the related element c4 associated with the processing element a4 has executor information c4-1, business service information c4-2, processing content information c4-3, and input/output data information c4-4. Moreover, the plurality of related elements c1 to c3 and c5 to c14 associated with each of the processing elements a1 to a3 and a5 to a14 excluding the processing element a4 respectively has, like the processing element a4, executor information c1-1 to c3-1 and c5-1 to c14-1, business service information c1-2 to c3-2 and c5-2 to c14-2, processing content information c1-3 to c3-3 and c5-3 to c14-3, and input/output data information c1-4 to c3-4 and c5-4 to c14-4. Illustration of such information is omitted for convenience' sake.

When it is necessary to identify one of a plurality of pieces of executor information, the numerals c1-1 to c14-1 are used as numerals below to indicate executor information, but the numeral c-1 is used when any one piece or a plurality of pieces of executor information is indicated.

Also, when it is necessary to identify one of a plurality of pieces of business service information, the numerals c1-2 to c14-2 are used as numerals below to indicate business service information, but the numeral c-2 is used when any one piece or a plurality of pieces of business service information is indicated.

Further, when it is necessary to identify one of a plurality of pieces of processing content information, the numerals c1-3 to c14-3 are used as numerals below to indicate processing content information, but the numeral c-3 is used when any one piece or a plurality of pieces of processing content information is indicated.

Also, when it is necessary to identify one of a plurality of pieces of input/output data information, the numerals c1-4 to c14-4 are used as numerals below to indicate input/output data information, but the numeral c-4 is used when any one piece or a plurality of pieces of input/output data information is indicated.

The executor information c-1 indicates executor identification information to identify an executor (person in charge) in charge of executing (implementing) the processing element a. More specifically, for example, the executor information c-1 selectively indicates executor identification information "StaffA", "StaffB", "StaffC", "StaffD" and the like associated with each executor in advance. Such executor identification information is generated, for example, by referencing the MW name or account name of the executor.

In the example shown in FIG. 2, if the processing element a4 is focused on, the executor information c4-1 associated with the processing element a4 indicates the executor identification information "StaffB". Moreover, the plurality of executor information c1-1 to c3-1 and c5-1 to c14-1 associated with each of the processing elements a1 to a3 and a5 to a14 excluding the processing element a4 respectively indicates, like the processing element a4, the executor identification information "StaffA", "StaffB", "StaffC", "StaffD" and the like selectively. Illustration of such information is omitted for convenience' sake.

The business service information c-2 indicates server identification information to identify a server performing processing on the processing element a. More specifically, for example, the business service information c-2 selectively indicates server identification information "Server1", "Server2", "Server3" and the like associated with each server in advance.

In the example shown in FIG. 2, if the processing element a4 is focused on, the business service information c4-2 associated with the processing element a4 indicates the server identification information "Server1". Moreover, the plurality of business service information c1-2 to c3-2 and c5-2 to c14-2 associated with each of the processing elements a1 to a3 and a5 to a14 excluding the processing element a4 respectively indicates, like the processing element a4, the server identification information "Server1", "Server2", "Server3" and the like selectively. Illustration of such information is also omitted for convenience' sake.

The processing content information c-3 indicates business operation identification information to identify the content of processing (business operations) performed by the processing element a. More specifically, for example, the processing content information c-3 selectively indicates business operation identification information "problem investigation", "acceptance of an order", "inventory inquiry", "ordering", "reception", "shipment", and "delivery" and the like defined in advance.

In the example shown in FIG. 2, if the processing element a4 is focused on, the processing content information c4-3 associated with the processing element a4 indicates the business operation identification information "problem investigation". Moreover, the plurality of processing content information c1-3 to c3-3 and c5-3 to c14-3 associated with each of the processing elements a1 to a3 and a5 to a14 excluding the processing element a4 respectively indicates, like the processing element a4, the business operation identification information "problem investigation", "acceptance of an order", "inventory inquiry", "ordering", "reception", "shipment", and "delivery" and the like selectively. Illustration of such information is also omitted for convenience' sake.

The input/output data information c-4 indicates input data identification information of data input into a server corresponding to the processing element a or output data identification information of data output from the server corresponding to the processing element a.

In the example shown in FIG. 2, if the processing element a4 is focused on, the input/output data information c4-4 associated with the processing element a4 indicates the input/output data identification information "investigation results". Moreover, the plurality of input/output data information c1-4 to c3-4 and c5-4 to c14-4 associated with each of the processing elements a1 to a3 and a5 to a14 excluding the processing element a4 respectively indicates, like the processing element a4, input data identification information, output data identification information or combinations thereof. Illustration of such information is also omitted for convenience' sake.

Figure 3A:
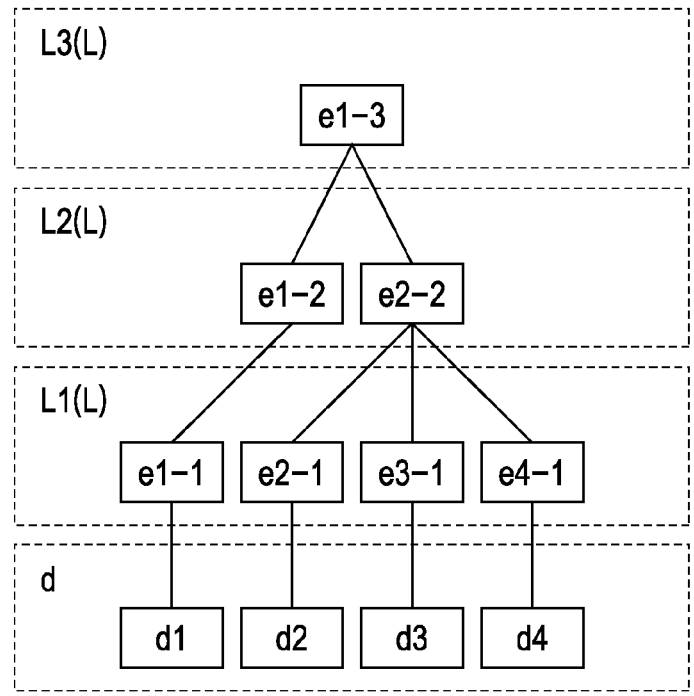
FIG. 3A is a diagram showing an example of relationships among structuring related elements, classification element groups, and classification elements of executor structured information held by a storage device of the process information structuring support system in the present embodiment.
Figure 3B:
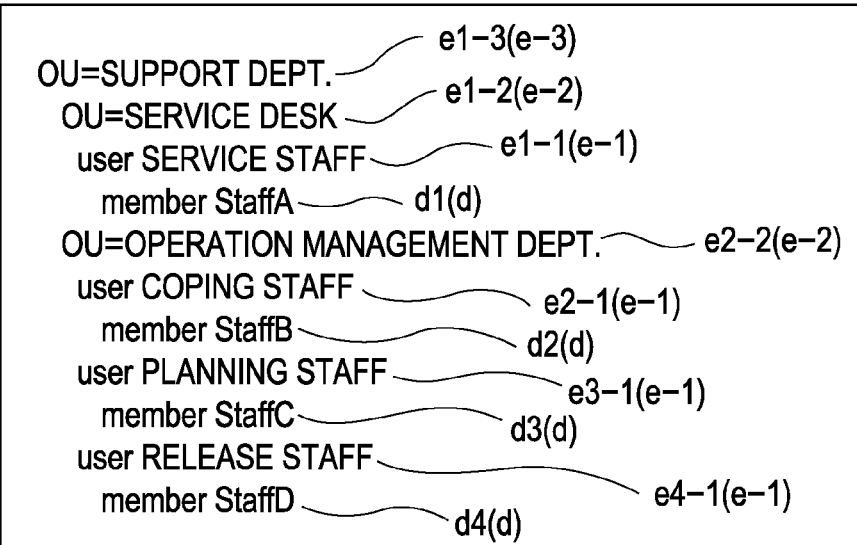
FIG. 3B is a diagram showing a concrete example of the executor structured information held by the storage device of the process information structuring support system in the present embodiment.

FIG. 3A and FIG. 3B are diagrams each showing an example of executor structured information S1 held by a storage device 12 of the process information structuring support system 10 in the present embodiment. More specifically, FIG. 3A is a diagram illustrating relationships among structuring related elements d1 to d4, classification element groups L1, L2, and L3, and classification elements e-1, e-2, and e-3 of the executor structured information S1 held by the storage device 12 of the process information structuring support system 10 in the present embodiment. FIG. 3B is a diagram showing a concrete example of the executor structured information S1 held by the storage device 12 of the process information structuring support system 10 in the present embodiment.

Figure 4A:
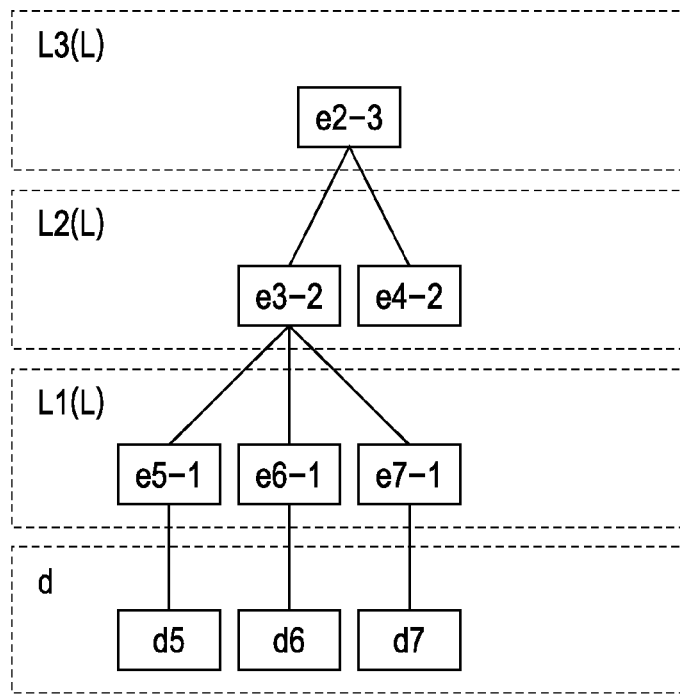
FIG. 4A is a diagram showing an example of relationships among structuring related elements, classification element groups, and classification elements of business service structured information held by the storage device of the process information structuring support system in the present embodiment.
Figure 4B:
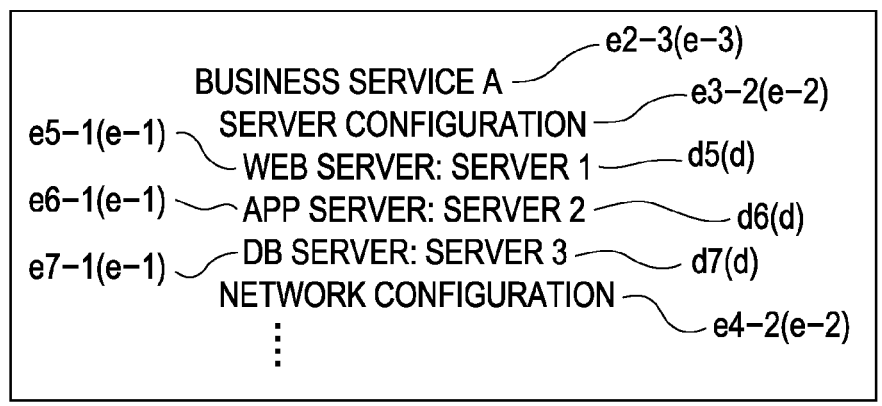
FIG. 4B is a diagram showing a concrete example of the business service structured information held by the storage device of the process information structuring support system in the present embodiment.

FIG. 4A and FIG. 4B are diagrams each showing an example of business service structured information S2 held by the storage device 12 of the process information structuring support system 10 in the present embodiment. More specifically, FIG. 4A is a diagram illustrating relationships among structuring related elements d5 to d7, the classification element groups L1, L2, and L3, and the classification elements e-1, e-2, and e-3 of the business service structured information S2 held by the storage device 12 of the process information structuring support system 10 in the present embodiment. FIG. 4B is a diagram showing a concrete example of the business service structured information S2 held by the storage device 12 of the process information structuring support system 10 in the present embodiment.

The storage device 12 holds structured information S in which information about the plurality of related elements c1 to c14 is structured.

The structured information S is information in which information about the plurality of related elements c1 to c14 is structured (classified; collected; grouped; grouping). For example, as shown in FIG. 3A, FIG. 3B, FIG. 4A, and FIG. 4B, the structured information S includes the executor structured information (first structured information) S1 in which information about the executor information c-1 is structured and the business service structured information (second structured information) S2 in which information about the business service information c-2 is structured.

Here, the executor structured information S1 is information about an organizational structure to which each executor belongs and a personnel structure in a directory server regarding each executor and, for example, information obtained by classifying executor identification information according to the person in charge or organization.

The business service structured information S2 is, for example, information about the organizational structure to which each server belongs and a service structure in a configuration management database (CMDB) regarding each server and, for example, information obtained by classifying server identification information according to service.

When it is necessary to identify one of the executor structured information or business service structured information, the numeral S1 or S2 is used as a numeral below to indicate structured information, but the numeral S is used when any one piece or a plurality of pieces of structured information is indicated.

As shown, for example, in FIG. 3A and FIG. 4A, the structured information S includes a plurality of structuring related elements d, and a classification element group L for hierarchically classifying the plurality of structuring related elements d.

The structuring related element d indicates an element name corresponding to the related element c.

In the executor structured information S1 shown in FIG. 3B, for example, the plurality of structuring related elements d1, d2, d3, and d4 indicates the element names "StaffA", "StaffB", "StaffC", and "StaffD" corresponding to the executor information c-1 respectively.

Also in the business service structured information S2 shown in FIG. 4B, for example, the plurality of structuring related elements d5, d6, and d7 indicates the element names "Server1", "Server2", and "Server3" corresponding to the business service information c-2 respectively.

When it is necessary to identify one of the plurality of structuring related elements, the numerals d1 to d7 are used as numerals below to indicate structuring related elements, but the numeral d is used when any one or plurality of structuring related elements is indicated.

The classification element group L is constructed by a hierarchical structure having a plurality of layers and, for example, as shown in FIG. 3A and FIG. 4A, by a hierarchical structure having the first-layer classification element group L1, the second-layer classification element group L2, and the third-layer classification element group L3. That is, these classification element groups L1, L2, and L3 are hierarchically provided from the layer immediately above the plurality of structuring related elements d to the top layer in the order of the first-layer classification element group L1, the second-layer classification element group L2, and the third-layer classification element group L3.

When it is necessary to identify one of the first-layer classification element group, the second-layer classification element group, or the third-layer classification element group, the numerals L1 to L3 are used as a numeral below to indicate the classification element group, but the numeral L is used when any one or plurality of classification element groups is indicated.

The first-layer classification element group L1 is a layer immediately above the plurality of structuring related elements d, and includes any one or a plurality of first classification elements (classification element; role) e-1.

The first classification element e-1 indicates the element name for classifying a portion or all of the plurality of structuring related elements d.

In the executor structured information S1 shown in FIG. 3A and FIG. 3B, for example, a plurality of first classification elements e1-1, e2-1, e3-1, and e4-1 constituting the first-layer classification element group L1 indicates the element names "Service staff", "Coping staff", "Planning staff", and "Release staff" respectively.

Here, the element name "Service staff" indicates the personnel organization to which the structuring related element d1 belongs. Also, the element name "Coping staff" indicates the personnel organization to which the structuring related element d2 belongs. Further, the element name "Planning staff" indicates the personnel organization to which the structuring related element d3 belongs. Also, the element name "Release staff" indicates the personnel organization to which the structuring related element d4 belongs.

Also in the business service structured information S2 shown in FIG. 4A and FIG. 4B, for example, a plurality of first classification elements e5-1, e6-1, and e7-1 constituting the first-layer classification element group L1 indicates the element names "Web server", "App server", and "DB server" respectively.

Here, the element name "Web server" indicates the service organization to which the structuring related element d5 belongs. Also, the element name "App server" indicates the service organization to which the structuring related element d6 belongs. Further, the element name "DB server" indicates the service organization to which the structuring related element d7 belongs.

When it is necessary to identify one of the plurality of first classification elements, the numerals e1-1 to e7-1 are used as numerals below to indicate the first classification elements, but the numeral e-1 is used when any one or plurality of first classification elements is indicated.

The second-layer classification element group L2 is a layer immediately above the first-layer classification element group L1 and includes any one or a plurality of second classification elements (classification element; role) e-2.

The second classification element e-2 indicates the element name for classifying a portion or all of the plurality of first classification elements e-1.

In the executor structured information S1 shown in FIG. 3A and FIG. 3B, for example, a plurality of second classification elements e1-2 and e2-2 constituting the second-layer classification element group L2 indicates the element names "Service desk" and "Operation management Dept." respectively.

Here, the element name "Service desk" indicates the personnel organization to which the first classification element e1-1 belongs. The element name "Operation management Dept." indicates the personnel organization to which the first classification elements e2-1 to e4-1 belong.

Also in the business service structured information S2 shown in FIG. 4A and FIG. 4B, for example, a plurality of second classification elements e3-2 and e4-2 constituting the second-layer classification element group L2 indicates the element names "Server configuration" and "Network configuration" respectively.

Here, the element name "Server configuration" indicates the service organization to which the first classification elements e5-1 to e7-1 belong. The element name "Network configuration" indicates the service organization to which any first classification element e-1 (not shown) other than the first classification elements e1-1 to e7-1 belongs.

When it is necessary to identify one of the plurality of second classification elements, the numerals e1-2 to e4-2 are used as numerals below to indicate the second classification elements, but the numeral e-2 is used when any one or a plurality of second classification elements is indicated.

The third-layer classification element group L3 is a layer immediately above the second-layer classification element group L2 and includes any one or a plurality of third classification elements (classification element; role) e-3. In the present embodiment, the third-layer classification element group L3 is the top layer.

The third classification element e-3 indicates the element name for classifying a portion or all of the plurality of second classification elements e-2.

In the executor structured information S1 shown in FIG. 3A and FIG. 3B, for example, a third classification element e1-3 constituting the third-layer classification element group L3 indicates the element name "Support Dept.".

Here, the element name "Support Dept." indicates the personnel organization to which the second classification elements e1-2 to e2-2 belong. Since the third-layer classification element group L3 is the top layer in the present embodiment, the element name "Support Dept." indicates the personnel organization to which all the second classification elements e1-2 and e2-2 constituting the second-layer classification element group L2 belong in the executor structured information S1.

Also in the business service structured information S2 shown in FIG. 4A and FIG. 4B, for example, a third classification element e2-3 constituting the third-layer classification element group L3 indicates the element name "Business service A".

Here, the element name "Business service A" indicates the service organization to which the second classification elements e3-2 to e4-2 belong. Since the third-layer classification element group L3 is the top layer in the present embodiment, the element name "Business service A" indicates the service organization to which all the second classification elements e3-2 and e4-2 constituting the second-layer classification element group L2 belong in the business service structured information S2.

When it is necessary to identify one of the plurality of third classification elements, the numeral e1-3 or e2-3 is used as a numeral below to indicate the third classification element, but the numeral e-3 is used when any one or a plurality of third classification elements is indicated.

When it is necessary to identify one of a first classification element, second classification element, or third classification element, the numerals e-1 to e-3 are used as a numeral below to indicate the classification element, but the numeral e is used when any one or a plurality of classification elements is indicated.

The information processing device 13 is constructed, as shown, for example, in FIG. 1, as a computer including a CPU (Central Processing Unit) 15, a display part 16, an input part 17, an input/output interface 18, an HDD (Hard Disk Drive) 19, a RAM (Random-Access Memory) 20, and a ROM (Read-Only Memory) 21.

The CPU 15 performs various numeric calculations, information processing, and mechanical control in the information processing device 13. The CPU 15 is constructed to function as a first acquisition part 22, a second acquisition part 23, an estimation part 24, a processing part 25, a generation part 26, and an output part 27.

The first acquisition part 22 acquires process information P generated by the process information generation device 11. The first acquisition part 22 acquires information needed to structure the process information P from the process information generation device 11.

The needed information includes, for example, the flow of procedures and data of various processes (operation/business processes) and, in the present embodiment, the plurality of processing elements a1 to a14, the plurality of data elements b0 to b11, and the plurality of related elements c1 to c14 as shown in FIG. 2.

Figure 5:
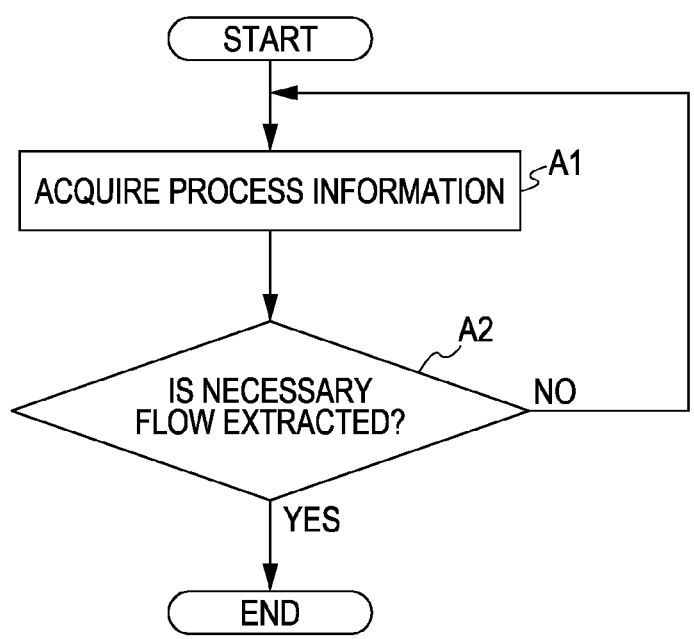
FIG. 5 is a flow chart showing a procedure for acquiring processing information by a first acquisition part in the process information structuring support system in the present embodiment.

Here, a procedure by which the first acquisition part 22 in the present embodiment acquires the process information P will be described following a flow chart (A1, A2) shown in FIG. 5.

First, the first acquisition part 22 acquires the process information P from the process information generation device 11 (step A1; first acquisition step).

Next, the first acquisition part 22 determines whether information (the plurality of processing elements a1 to a14, the plurality of data elements b0 to b11, and the plurality of related elements c1 to c14) needed to structure the process information P has been extracted (is contained) in the acquired process information P (step A2).

If the first acquisition part 22 determines that information needed to structure the process information P has not been extracted in the acquired process information P (See the "No" route at step A2), the process information P is acquired again from the process information generation device 11 after returning to the step A1.

If, on the other hand, the first acquisition part 22 determines that information needed to structure the process information P has been extracted in the acquired process information P (See the "Yes" route at step A2), processing is terminated.

The second acquisition part 23 acquires the structured information S held in the storage device 12 and in the present embodiment, the executor structured information S1 and the business service structured information S2 held in the storage device 12.

The estimation part 24 combines a plurality of pieces of structured information (for example, the executor structured information S1 and the business service structured information S2) to supplement information that is unknown (an unspecified related element x) from single structured information (for example, the executor structured information S1).

If, for example, the executor information c-1 is an unspecified related element x in the process information P, the estimation part 24 estimates the unspecified related element x as a specified element contained in the executor structured information S1, based on a processing element a associated with the unspecified related element x and the business service structured information S2. In the present embodiment, an unspecified related element x is executor identification information that cannot identify an executor such as an Administrator and root.

More specifically, if an unspecified related element x is contained in the process information P, for example, the estimation part 24 acquires a processing element a associated with the unspecified related element x. Next, the estimation part 24 acquires terminal information (such as an IP address and account information) about an execution terminal (execution location; not shown) used for execution of the acquired processing element a from the process information P. The estimation part 24 also acquires business service information c-2 associated with the acquired processing element a from the process information P. Then, the estimation part 24 identifies the execution terminal from the acquired terminal information and also a server (application) to which the execution terminal is connected. Subsequently, the estimation part 24 estimates (conjectures) a classification element e regarding the organization to which the identified execution terminal belongs as a specified element by checking the identified server, the business service information c-2, the business service structured information S2, and the executor structured information S1 against each other. For example, the estimation part 24 identifies the classification element e indicating the service organization to which the identified server belongs by checking the identified server, the business service information c-2, and the business service structured information S2, against each other. Then, the estimation part 24 regards the classification element e indicating the personnel organization to which the identified service organization belongs as a specified element by checking the identified service organization and the executor structured information S1 against each other. In the present embodiment, if a plurality of executors having the same name such as the Administrator and root exists in a plurality of departments and each of the plurality of executors belongs to a different service organization, the estimation part 24 regards each executor as a different executor for each service.

Therefore, the estimation part 24 identifies the organization to which an executor belongs by checking the executor acquired from terminal information regarding the execution terminal of the processing element a and organization information acquired from the business service information c-2 against each other.

The processing part 25 performs processing to attach (tag) the classification element e contained in the executor structured information S1 acquired by the second acquisition part 23 to each of the plurality of processing elements a1 to a14 contained in the process information P acquired by the first acquisition part 22 as additional information.

More specifically, the processing part 25 identifies the structuring related element d matching each piece of the executor information c1-1 to c14-1 contained in the process information P from the executor structured information S1.

Then, the processing part 25 sequentially acquires the classification element e to which the identified structuring related element d belongs for each piece of the executor information c1-1 to c14-1 from each of the classification element groups L1 to L3 constituting the executor structured information S1. For example, the processing part 25 acquires the first classification element e-1 from the first-layer classification element group L1, the second classification element e-2 from the second-layer classification element group L2, and the third classification element e-3 from the third-layer classification element group L3, which is the top layer, in stages for each piece of the executor information c1-1 to c14-1 from the first-layer classification element group L1 to the third-layer classification element group L3.

Subsequently, the processing part 25 performs processing to attach the first classification element e-1, the second classification element e-2, and the third classification element e-3 acquired from each of the plurality of processing elements a1 to a14 to each of the plurality of processing elements a1 to a14 as additional information.

Figure 6:
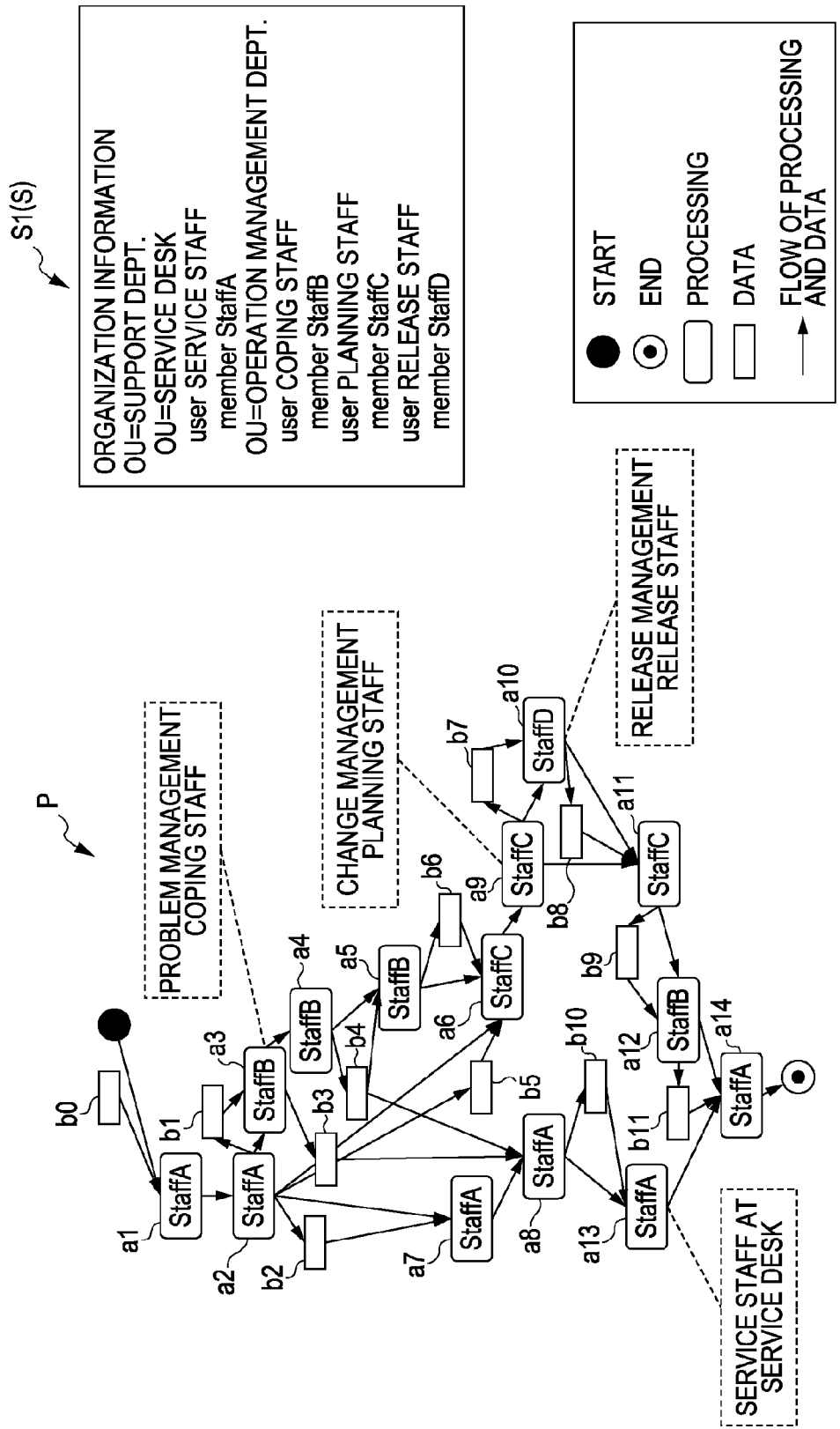
FIG. 6 is a diagram exemplarily showing an example of process information to describe functions of a processing part in the process information structuring support system in the present embodiment.

FIG. 6 is a diagram exemplarily showing an example of the process information P to describe functions of the processing part 25 in the process information structuring support system 10 in the present embodiment.

Though FIG. 6 shows the same process information P as that shown in FIG. 2, illustration of each of the related elements c1 to c14 is omitted for convenience, and executor information c1-1 to c14-1 associated with each of the processing elements a1 to a14 is shown in each of the processing elements a1 to a14.

In the example shown in FIG. 6, if the processing element a4 is focused on, the processing part 25 acquires the executor information c4-1 (executor identification information "StaffB") associated with the processing element a4 from the process information P acquired by the first acquisition part 22.

Next, the processing part 25 identifies the structuring related element d2 (element name "StaffB") matching the executor information c4-1 from the executor structured information S1.

Then, the processing part 25 acquires the first classification element e2-1 (element name "Coping staff") to which the identified structuring related element d2 belongs from the first-layer classification element group L1. Also, the processing part 25 acquires the second classification element e2-2 (element name "Operation management Dept.") to which the first classification element e2-1 belongs from the second-layer classification element group L2. Further, the processing part 25 acquires the third classification element e1-3 (element name "Support Dept.") to which the second classification element e2-2 belongs from the third-layer classification element group L3.

Subsequently, the processing part 25 performs processing to attach the acquired first classification element e2-1, second classification element e2-2, and third classification element e1-3 to the processing element a4 as additional information.

The processing part 25 also acquires, from the process information P, the executor informational a1-1 to a3-1 and a5-1 to a14-1 associated with each of the processing elements a1 to a3 and a5 to a14 excluding the processing element a4 contained in the process information P acquired by the first acquisition part 22. For example, as shown in FIG. 6, the processing part 25 acquires the executor information c-1 indicating the executor identification information "StaffA" for the processing elements a1, a2, a7, a8, a13, and a14. Also, the second acquisition part 23 acquires the executor information c-1 indicating the executor identification information "StaffB" for the processing elements a3, a4, a5, and a12. Also, the second acquisition part 23 acquires the executor information c-1 indicating the executor identification information "StaffC" for the processing elements a6, a9, and all. Further, the second acquisition part 23 acquires the executor information c-1 indicating the executor identification information "StaffD" for the processing element a10.

Henceforth, the processing part 25 also performs processing to attach the first classification element e-1, the second classification element e-2, and the third classification element e-3 to each of the processing elements a1 to a3 and a5 to a14 as additional information by performing processing similar to that for the processing element a4.

Accordingly, the processing part 25 generates structuring target information in which additional information is attached to each of the plurality of processing elements a1 to a14. For example, as shown in FIG. 6, structuring target information generated by the processing part 25 has additional information indicating "problem management coping staff" attached to the processing element a3. Also, for example, additional information indicating "change management planning staff" is attached to the processing element a9. Additional information indicating "release management release staff" is attached to the processing element a10. Additional information indicating "service desk at service staff" is attached to the processing element a13. Detailed illustration of structuring target information is omitted for convenience' sake.

If the executor information c-1 is an unspecified related element x in the process information P, the processing part 25 performs processing to attach a specified element estimated by the estimation part 24 to the processing element a associated with the unspecified related element x as additional information.

The generation part 26 generates structured process information Q by grouping (structuring) the plurality of processing elements a1 to a14 in the structuring target information generated by the processing part 25. For example, the generation part 26 generates the structured process information Q by combining the structured information S and a related element c contained in the process information P. Therefore, the generation part 26 generates the structured process information Q by structuring the plurality of processing elements a1 to a14 in the process information P acquired by the first acquisition part 22 in accordance with the executor structured information S1 acquired by the second acquisition part 23.

In the present embodiment, the generation part 26 forms groups of executors in the same organization by referencing (checking) relationships among pieces of executor information c-1 contained in the process information P and the organizational structure indicated by the executor structured information S1 acquired by the second acquisition part 23. That is, the generation part 26 converts the process information P, which is an automatic extraction result, by adding the executor structured information S1 into structuring target information to group the processing elements a according to role of the executor.

Figure 7:
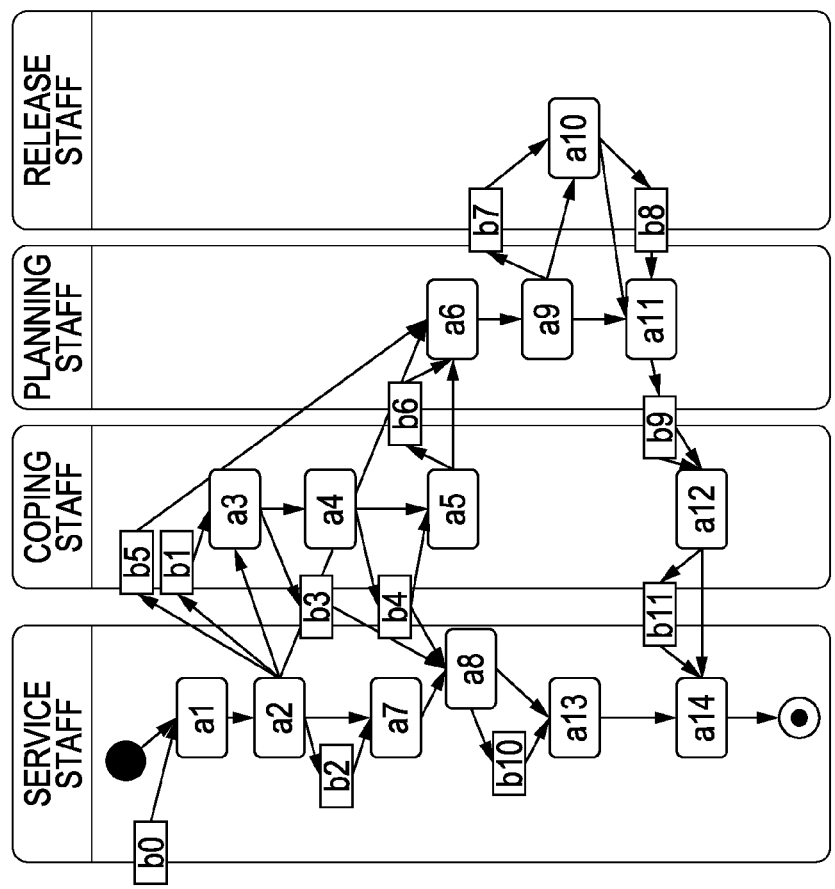
FIG. 7 is a diagram exemplarily showing an example of primary structured process information generated by a generation part in the process information structuring support system in the present embodiment.
Figure 8:
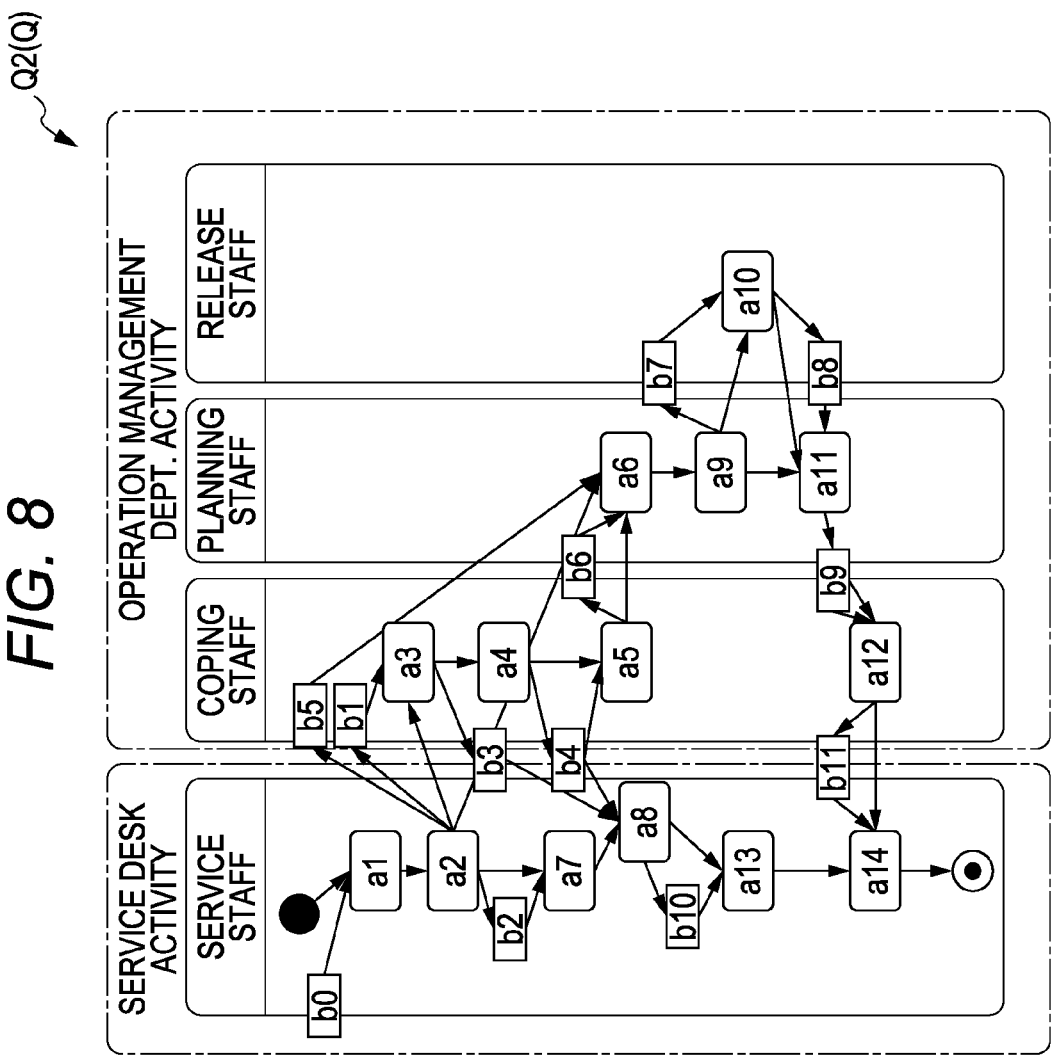
FIG. 8 is a diagram exemplarily showing an example of secondary structured process information generated by the generation part in the process information structuring support system in the present embodiment.
Figure 9:
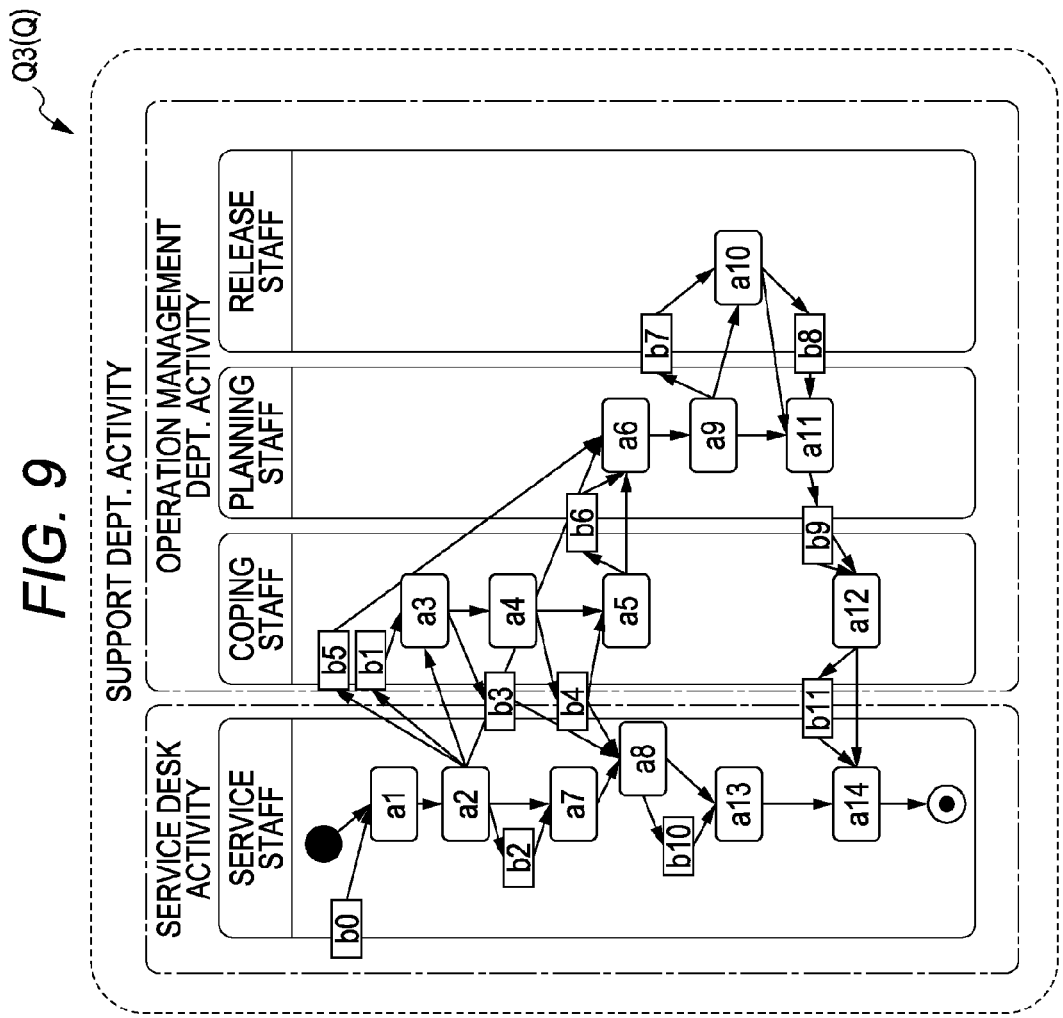
FIG. 9 is a diagram exemplarily showing an example of tertiary structured process information generated by the generation part in the process information structuring support system in the present embodiment.

FIG. 7 is a diagram exemplarily showing an example of primary structured process information Q1 generated by the generation part 26 in the process information structuring support system 10 in the present embodiment. FIG. 8 is a diagram exemplarily showing an example of secondary structured process information Q2 generated by the generation part 26 in the process information structuring support system 10 in the present embodiment. FIG. 9 is a diagram exemplarily showing an example of tertiary structured process information Q3 generated by the generation part 26 in the process information structuring support system 10 in the present embodiment.

Concrete examples of generating structured process information Q (Q1 to Q3) by the generation part 26 will be described below with reference to FIG. 7 to FIG. 9.

First, the generation part 26 references the first classification element e-1 (additional information) attached to each of the processing elements a1 to as14 of the structuring target information to generate primary structured process information Q1 (structured process information Q) by grouping processing elements a whose element names of the first classification element e-1 match.

In the example shown in FIG. 7, the generation part 26 groups the processing elements a1, a2, a7, a8, a13, and a14 whose executor information c-1 indicates the executor identification information "StaffA" and whose first classification element e-1 indicates the element name "Service staff" as a group (hereinafter, it may be referred to as just grouping). Also, the generation part 26 groups the processing elements a3, a4, a5, and a12 whose executor information c-1 indicates the executor identification information "StaffB" and whose first classification element e-1 indicates the element name "Coping staff" as a group. Further, the generation part 26 groups the processing elements a6, a9, and a11 whose executor information c-1 indicates the executor identification information "StaffC" and whose first classification element e-1 indicates the element name "Planning staff" as a group. Also, the generation part 26 groups the processing element a10 whose executor information c-1 indicates the executor identification information "StaffD" and whose first classification element e-1 indicates the element name "Release staff" as a group.

Accordingly, the generation part 26 generates the primary structured process information Q1 (structured process information Q) in which the plurality of processing elements a1 to a14 of the structuring target information is structured in accordance with the first-layer classification element group L1.

Next, the generation part 26 references the second classification element e-2 (additional information) attached to each of the processing elements a1 to as14 of the primary structured process information Q1 to generate secondary structured process information Q2 (structured process information Q) by grouping processing elements a whose element names of the second classification element e-2 match.

In the example shown in FIG. 8, the generation part 26 groups the first classification element e-1 indicating the element name "Service staff" belonging to the second classification element e-2 indicating the element name "Service desk". Also, the generation part 26 groups the first classification elements e-1 indicating the element names "Coping staff", "Planning staff", and "Release staff" belonging to the second classification element e-2 indicating the element name "Operation management Dept.".

Accordingly, the generation part 26 generates the secondary structured process information Q2 (structured process information Q) in which the plurality of processing elements a1 to a14 of the primary structured process information Q1 is structured in accordance with the second-layer classification element group L2.

Then, the generation part 26 references the third classification element e-3 (additional information) attached to each of the processing elements a1 to as14 of the secondary structured process information Q2 to generate tertiary structured process information Q3 (structured process information Q) by grouping processing elements a whose element names of the third classification element e-3 match.

In the example shown in FIG. 9, the generation part 26 groups the second classification elements e-2 indicating element names "Service desk" and "Operation management Dept." belonging to the third classification element e-3 indicating the element name "Support Dept.".

Accordingly, the generation part 26 generates the tertiary structured process information Q3 (structured process information Q) in which the plurality of processing elements a1 to a14 of the secondary structured process information Q2 is structured in accordance with the third-layer classification element group L3.

When there are higher layers (higher-level structure) than the third-layer classification element group L3, the generation part 26 repeats generation of structured process information Q until higher layers run out (the top layer is reached). In the present embodiment, however, the third-layer classification element group L3 is the top layer and thus, processing terminates when the tertiary structured process information Q3 is generated.

Therefore, as described above, the generation part 26 generates the structured process information Q in which the plurality of processing elements a1 to a14 are grouped in stages from the first-layer classification element group L1 to the third-layer classification element group L3 which is the top layer.

If the executor information c-1 is an unspecified related element x in the process information P, the generation part 26 structures the processing element a associated with the unspecified related element x in accordance with the specified element (additional information) attached by the processing part 25. Therefore, if the first related element c-1 is an unspecified related element x in the process information P acquired by the first acquisition part 22, the generation part 26 generates structured process information Q by structuring the plurality of processing elements a1 to a14 in accordance with the specified element estimated by the estimation part 24 and the executor structured information S1 acquired by the second acquisition part 23.

In the present embodiment, in addition to generation of the structured process information Q in which the plurality of processing elements a1 to a14 in the process information P is structured in accordance with the executor structured information S1, the generation part 26 generates structured process information Z (not shown) in which the plurality of processing elements a1 to a14 in the process information P is structured in accordance with the business service structured information S2. However, the generation technique of the structured process information Z is the same as that of the structured process information Q described above and thus, a description thereof is omitted for convenience' sake.

The output part 27 outputs the structured process information Q and the structured process information Z generated by the generation part 26. The output part 27 outputs the structured process information Q and the structured process information Z, for example, to the display part 16 described later or a printer (not shown). The output part 27 is realized, for example, by a display control program or print control program.

Figure 10:
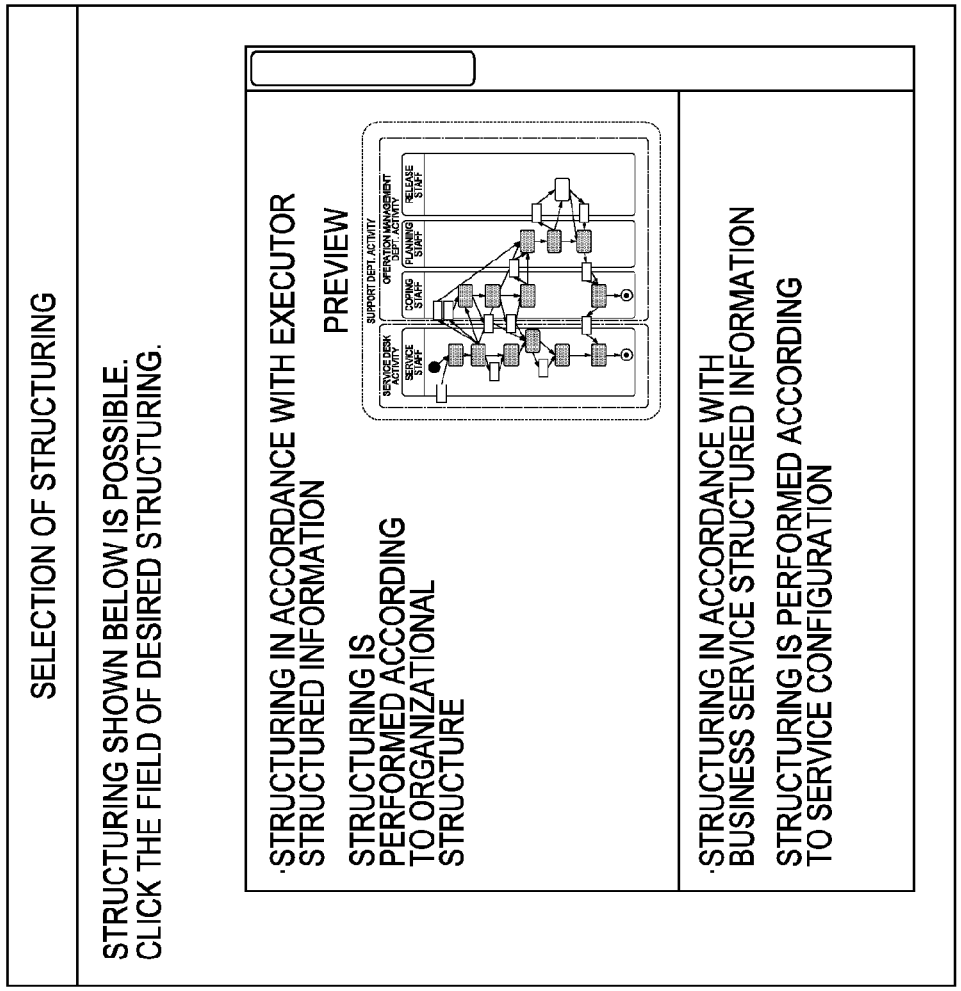
FIG. 10 is a diagram showing an example of a selection screen displayed in a display part in the process information structuring support system in the present embodiment.

FIG. 10 is a diagram showing an example of a selection screen of the structured process information Q and Z displayed in the display part 16 in the process information structuring support system 10 in the present embodiment.

The display part 16 is a display device for displaying various kinds of information about the information processing device 13 and is constructed, for example, of a CRT (Cathode Ray Tube) display or LCD (Liquid Crystal Display). In the present embodiment, as shown in FIG. 10, the display part 16 is constructed to function as a GUI (Graphical User Interface) screen that displays the structured process information Q and the structured process information Z output from the output part 27 side by side. That is, if a plurality of candidates for structuring is present, results of structuring may change depending on the order of structuring and thus, in the present embodiment, the display part 16 is caused to display a list of candidates for structuring and result examples (preview) for presentation to a user to allow the user to make a selection.

When a plurality of types of structured process information Q1 and Q2 is displayed side by side, the display part 16 may display such structured process information by priority. For example, the display part 16 can display the structured process information Q1 and Q2 in descending order of points by giving points to the structured process information Q1 and Q2. In such a case, the display part 16 can use a structuring index quantitatively showing ease of understanding the plurality of types of structured process information Q1 and Q2 such as the number of actions of an activity (a unity of actions representing a sequence of work) as points. Or, for example, the display part 16 may display only structured process information in which the number of actions of an activity is equal to or less than a threshold (for example, 20).

The input part 17 inputs data or instruction content into the information processing device 13 by various kinds of input or operations performed by a user or the like and includes, for example, a mouse or a keyboard. The input part 17 also functions as a selection part 28.

The selection part 28 selects one of the plurality of pieces of structured process information Q and the structured process information Z displayed in the display part 16 after input by a user and selects structured process information obtained by structuring the selected structured process information as selected structured process information. That is, the selection part 28 selects one of the structured process information Q and the structured process information Z as selected structured information. Therefore, the generation part 26 can be considered to generate the structured process information Q and Z by structuring the plurality of processing elements a1 to a14 according to one of the executor structured information S1 and the business service structured information S2.

Then, the generation part 26 further structures the selected structured process information selected by the selection part 28 in accordance with the non-selected structured information not selected by the selection part 28.

For example, if the structured process information Q is selected as the selected structured process information, the generation part 26 further structures the selected structured process information Q in accordance with non-selected structured information (the business service structured information S2) in a group structured in accordance with the executor structured information S1.

Also, for example, if the structured process information Z is selected as the selected structured process information, the generation part 26 further structures the selected structured process information Z in accordance with non-selected structured information (the executor structured information S1) in a group structured in accordance with the business service structured information S2.

Therefore, when a plurality of classification proposals are made in terms of structuring, the process information structuring support system 10 supports operation process structuring of users by presenting such proposals to a person in charge of process visualization for selection.

The input/output interface 18 controls input/output devices and has the display part 16, the input part 17 and the like connected thereto to control various kinds of input/output processing by the display part 16, the input part 17 and the like.

The HDD 19 is a storage device to store various kinds of programs including the OS (Operating System) and data.

The RAM 20 temporarily expands/stores data and programs when the CPU 15 performs various kinds of arithmetic operations.

The ROM 21 stores programs and various kinds of data executed/processed by the CPU 15.

Figure 11:
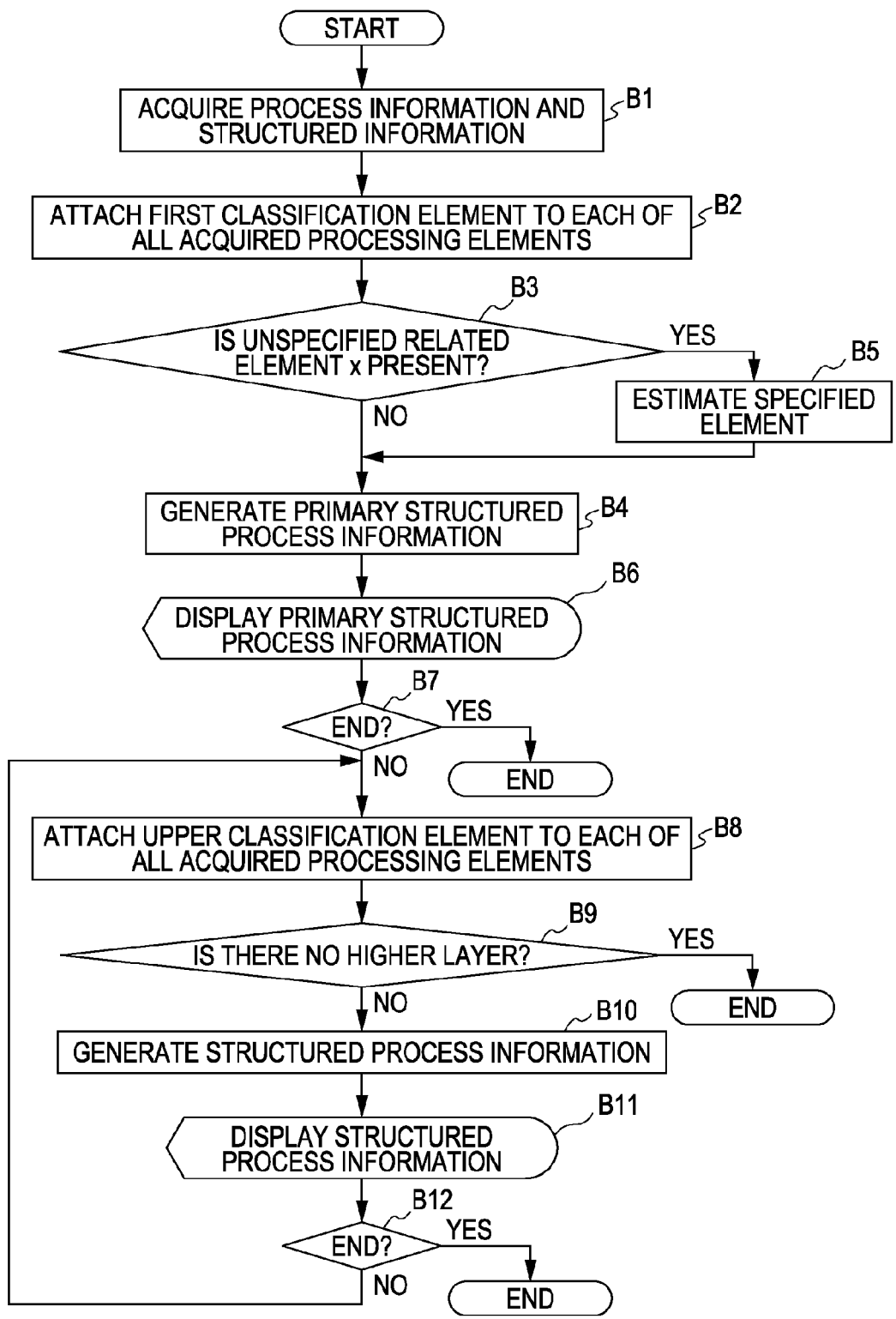
FIG. 11 is a flow chart showing an example of a way of generating structured process information in the process information structuring support system in the present embodiment.

An example of the generation technique of the structured process information Q in the process information structuring support system 10 in the present embodiment configured as described above will be described following a flow chart (step B1 to step B12) shown in FIG. 11.

The generation technique of the structured process information Q structured in accordance with the executor structured information S1 will be described below and that of the structured process information Z structured in accordance with the business service structured information S2 is omitted for convenience' sake.

First, the first acquisition part 22 acquires the process information P (See FIGS. 2 and 6) from the process information generation device 11 (first acquisition step) and the second acquisition part 23 acquires the first executor structured information S1 from the storage device 12 (step B1; second acquisition step). In the present embodiment, organization information of each executor of all the processing elements a1 to a14 contained in the process information P is acquired.

Next, the processing part 25 performs processing to attach the first classification element e-1 acquired for each of the processing elements a1 to a14 to each of all the processing elements a1 to a14 contained in the process information P as additional information (step B2; processing step). In the present embodiment, the role corresponding to each executor is acquired. Accordingly, the processing part 25 generates primary structuring target information in which the first classification element e-1 is attached to each of the plurality of processing elements a1 to a14 as additional information.

Then, the estimation part 24 determines whether or not any unspecified related element x is present in each of the executor information c1-1 to c14-1 contained in the process information P (step B3). In the present embodiment, the estimation part 24 determines whether or not an executor of the same name (such as an Administrator and root) is present in a plurality of departments. That is, if an executor of the same name is present in a plurality of departments, the estimation part 24 assumes that an unspecified related element x is present and, if no executor of the same name is present in a plurality of departments, the estimation part 24 assumes that no unspecified related element x is present.

If no unspecified related element x is present (See "NO" route at step B3), the generation part 26 generates the primary structured process information Q1 by structuring all the processing elements a1 to a14 contained in the primary structuring target information in accordance with the first-layer classification element group L1 (step B4; generation step). In the present embodiment, the processing elements a are classified according to the role to which the executor of the processing element a belongs.

If, on the other hand, an unspecified related element x is present (See "YES" route at step B3), the estimation part 24 estimates the unspecified related element x as a specified element contained in the executor structured information S1 based on the processing element a associated with the unspecified related element x and the business service structured information S2 (step B5; estimation step) before proceeding to step B4.

Then, after the primary structured process information Q1 is generated by the generation part 26, the output part 27 outputs the primary structured process information Q1 to the display part 16 (output step) and the display part 16 displays the primary structured process information Q1 (step B6; display step).

Subsequently, the user determines whether to terminate processing (step B7) and if the user determines to terminate processing (See "YES" route at step B7) processing is terminated.

If, on the other hand, the user determines to continue processing (See "NO" route at step B7), the processing part 25 performs processing to attach the second classification element e-2 ((k+1)-th classification element e-k+1) acquired for each of the processing elements a1 to a14 to each of all the processing elements a1 to a14 contained in the primary structured process information Q1 (k (k is a natural number)-th order structured process information Qk) as additional information (step B8). That is, the processing part 25 attaches the classification element e-k+1 (higher-level classification element) corresponding to the classification element group Lk+1 positioned higher than (higher-level organization; higher-level structure) the classification element group Lk contained in the structured process information Qk currently generated to each of the processing elements a1 to a14. Accordingly, the processing part 25 generates secondary structuring target information ((k+1)-th order structuring target information) in which the second classification element e-2 ((k+1)-th classification element e-k+1) is attached to each of the plurality of processing elements a1 to a14 as additional information.

Here, if there is no layer higher than the first-layer classification element group L1 (k-th-layer classification element group Lk) and no secondary structuring target information ((k+1)-th order structuring target information) can be generated (See "YES" route at step B9), processing is terminated by the processing part 25 without generating secondary structuring target information ((k+1)-th order structuring target information).

If, on the other hand, the processing part 25 generates secondary structuring target information ((k+1)-th order structuring target information) (See "NO" route at step B9), the generation part 26 generates the secondary structured process information Q2 ((k+1)-th order structured process information Qk+1) by structuring all the processing elements a1 to a14 contained in the secondary structuring target information Q2 ((k+1)-th order structuring target information) in accordance with the second-layer classification element group L2 ((k+1)-th-layer classification element group Lk+1) (step B10).

Then, after the secondary structured process information Q2 ((k+1)-th order structured process information Qk+1) is generated by the generation part 26, the output part 27 outputs the secondary structured process information Q2 ((k+1)-th order structured process information Qk+1) to the display part 16 and the display part 16 displays the secondary structured process information Q2 ((k+1)-th order structured process information Qk+1) (step B11).

Subsequently, the user determines whether to terminate processing (step B12) and if the user determines to continue processing (See "NO" route at step B12) processing returns to step B8.

If, on the other hand, the user determines to terminate processing (See "YES" route at step B12) processing is terminated.

Effects obtained by the process information structuring support system 10 in the present embodiment will be described below with reference to FIG. 12.

Figure 12:
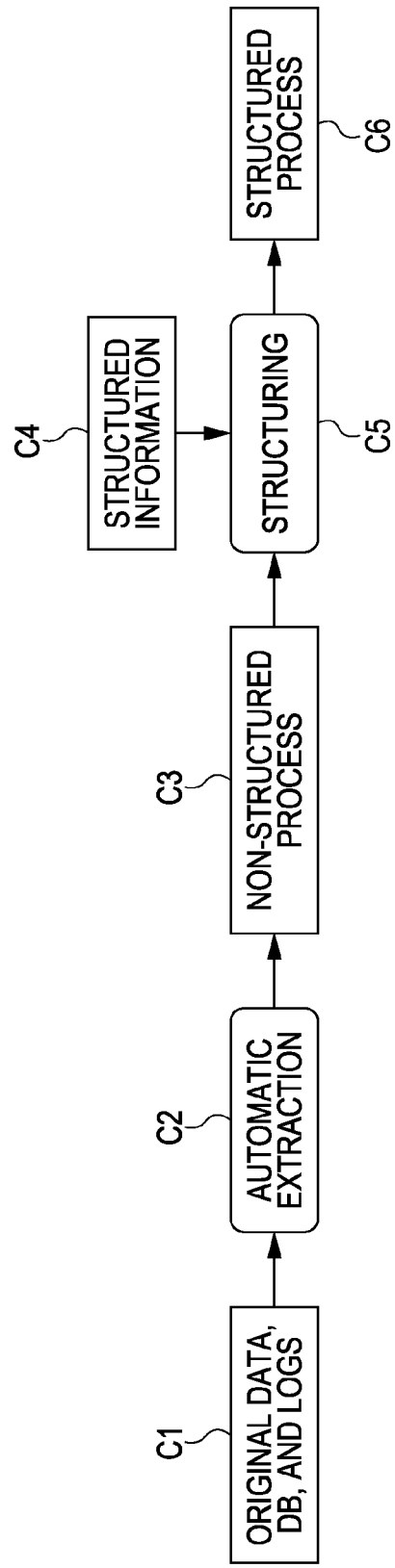
FIG. 12 is a diagram illustrating an effect obtained by the process information structuring support system in the present embodiment.

Thus, according to the process information structuring support system 10 in the present embodiment, as shown in FIG. 12, the process information generation device 11 automatically extracts process information P in which the flow of the processing elements a1 to a14 is shown in a flat structure from original data, DB (Database), and logs (See numerals "C1" to "C3" in FIG. 12). Then, the generation part 26 structures the plurality of processing elements a1 to a14 (See numeral "C4" in FIG. 12) contained in the process information P in accordance with the structured information S (See numeral "C5" in FIG. 12). Accordingly, structured process information Q in which the processing elements a1 to a14 are classified in units of in-process action (work unit that cannot be further divided) in terms of the structured information S (See numeral "C6" in FIG. 12) is generated. Then, the display part 16 displays the structured process information Q generated by the generation part 26 for presentation to the user. If a plurality of pieces of structured process information Q1 and Q2 is present, the plurality of pieces of structured process information Q1 and Q2 is presented to the user for selection.

Thus, when the process information P is visualized by forming the process information P into a hierarchical structure, the process information P in which the flow of the processing elements a1 to a14 is shown in a flat structure can automatically be structured. Therefore, an enormous amount of man-hours of manual work needed for structuring of the process information P can significantly be reduced.

By using the executor structured information S1 or the business service structured information S2 as the structured information S, the process information P, which is an unstructured manual arrangement after automatic extraction, can easily be structured by using implicit associations between an organizational structure or service structure and the processing elements a1 to a14. Particularly, since the executor is necessarily dependent on an organizational structure, structuring of the process information P in a natural form can easily be realized by using the organizational structure.

Further, by combining the plurality of structured information S1 and S2 to supplement information that is unknown from the single structured information S1, types of the structured process information Q can be widened to enable appropriate structuring of the process information P.

Also, by presenting the structured process information Q to the user, understanding and reviews of the structure of the structured process information Q can be made easier even for a person without skills.

Further, by presenting the plurality of types of structured process information Q1 and Q2 to the user for selection, the process information P can be structured as desired by the user while the user checks results of the structured process information Q1 and Q2.

Also, by arranging the structured process information Q1 and Q2 in descending order of points of the structuring index when presented to the user, even the user without skills in structuring can select more desirable structured process information Q.

[2] Description of Other Aspects Using the Present Embodiment

Other aspects using the present embodiment will be described below.

Figure 13:
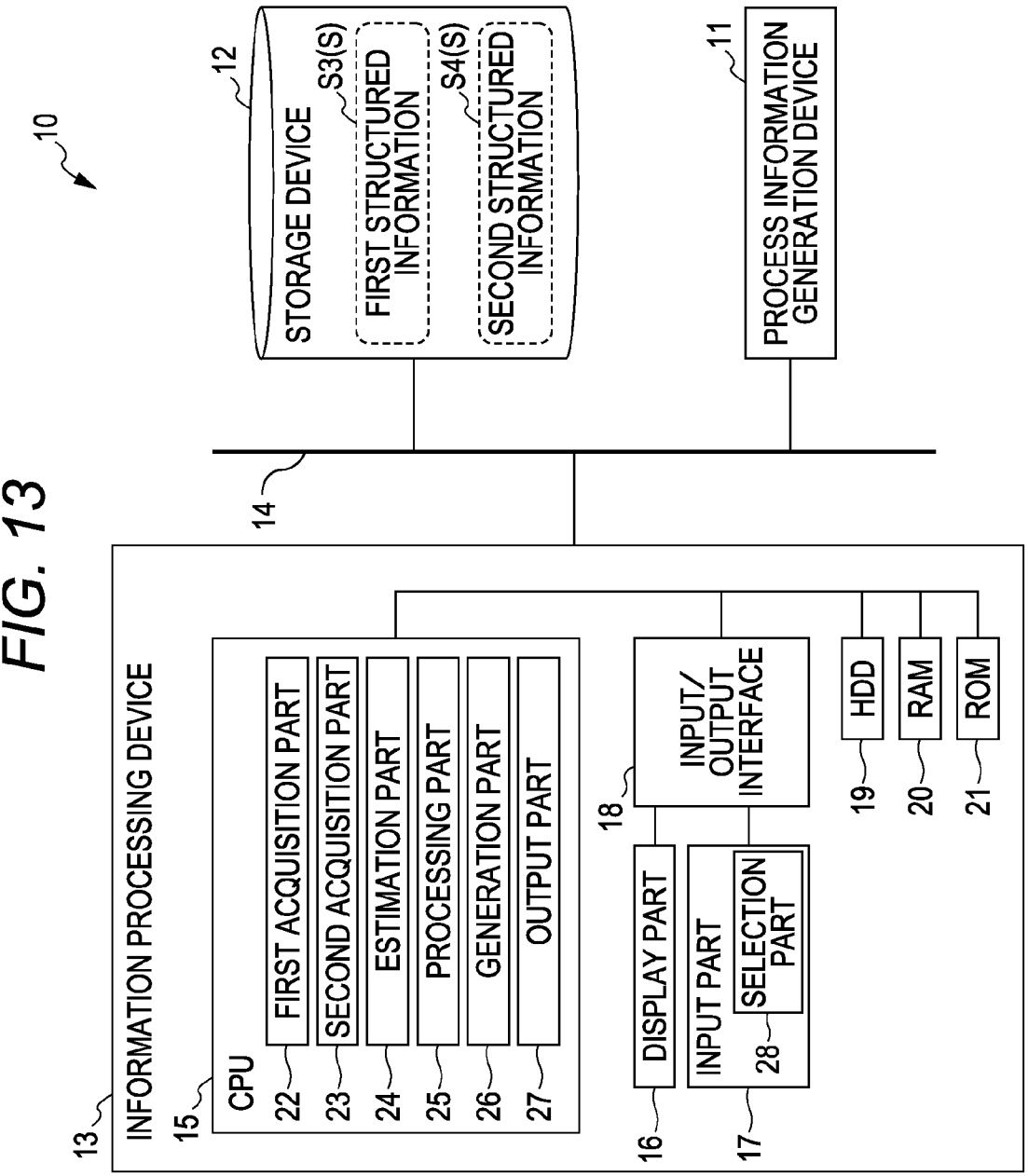
FIG. 13 is a diagram exemplarily showing a configuration example of the process information structuring support system as another aspect using the present embodiment.
Figure 14:
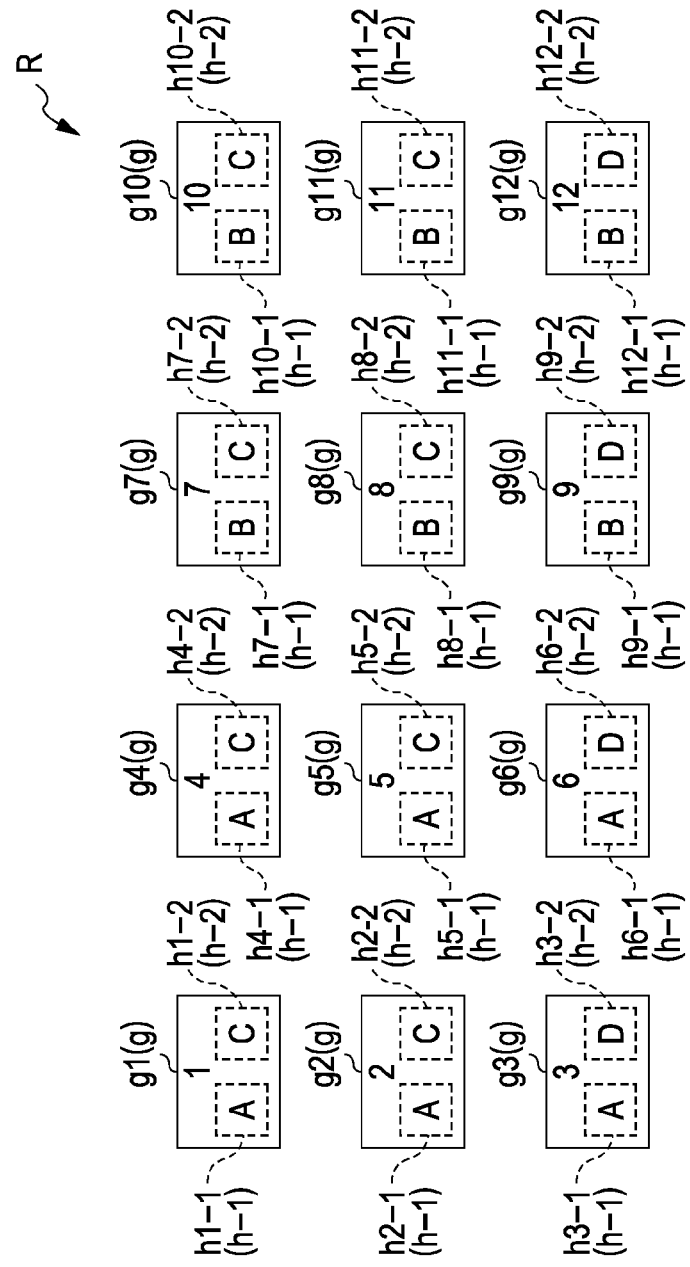
FIG. 14 is a diagram exemplarily showing an example of process information generated by the process information generation device in the process information structuring support system as the other aspect using the present embodiment.

FIG. 13 is a diagram exemplarily showing a configuration example of the process information structuring support system 10 as another aspect using the present embodiment. FIG. 14 is a diagram exemplarily showing an example of process information R generated by the process information generation device 11 thereof.

As shown in FIG. 13, the process information structuring support system 10 in another aspect using an embodiment is configured in the same manner as the process information structuring support system 10 in the embodiment.

Then, in the process information structuring support system 10 in the present aspect, in contrast to the process information P in the above embodiment, the process information generation device 11 generates the process information R shown in FIG. 14. Also, in the process information structuring support system 10 in the present aspect, in contrast to the executor structured information S1 and the business service structured information S2 in the above embodiment, as shown in FIG. 13, the storage device 12 holds first structured information S3 and second structured information S4.

The same numerals in FIGS. 13 and 14 as the numerals described above indicate the same or substantially the same components and thus, a detailed description thereof is omitted.

As shown, for example, in FIG. 14, the process information R generated by the process information generation device 11 is, like the process information P (See FIG. 2) in the above embodiment, information showing the flow of a plurality of processing elements g1 to g12.

The plurality of processing elements g1 to g12 has a function configuration similar to that of the plurality of processing elements a1 to a14 in the above embodiment.

Like the process information P in the above embodiment, the process information R has a plurality of data elements and processing elements and information such as arrows showing the flow of data attached thereto, but illustration thereof in a figure is omitted and also a description thereof is omitted for convenience' sake.

Then, the process information R has a plurality of first related elements h1-1 to h12-1 associated with the plurality of processing elements g1 to g12 respectively, and a plurality of second related elements h1-2 to h12-2 associated with the plurality of processing elements g1 to g12 respectively attached thereto. Various information such as the executor information c-1, the business service information c-2, the processing content information c-3, and the input/output data information c-4 in the above embodiment may be used as the plurality of first related elements h1-1 to h12-1 and the plurality of second related elements h1-2 to h12-2.

Generalized elements of the first related elements h1-1 to h12-1 and the plurality of second related elements h1-2 to h12-2 will be taken as examples for a description below for convenience' sake.

In the example shown in FIG. 14, if the processing element g1 is focused on, the first related element h1-1 and the second related element h1-2 are associated with the processing element g1. Also, like the processing element g1, the first related elements h2-1 to h12-1 and the second related elements h2-2 to h12-2 are associated with the processing elements g2 to g12 excluding the processing element g1 respectively.

When it is necessary to identify one of a plurality of processing elements, the numerals g1 to g12 are used as a numeral below to indicate the processing element, but the numeral g is used when any one or a plurality of processing elements is indicated.

Also, when it is necessary to identify one of the plurality of first related elements, the numerals h1-1 to h12-1 are used as a numeral below to indicate the first related element, but the numeral h-1 is used when any one or a plurality of first related elements is indicated.

Further, when it is necessary to identify one of the plurality of second related elements, the numerals h1-2 to h12-2 are used as a numeral below to indicate the second related element, but the numeral h-2 is used when any one or a plurality of second related elements is indicated.

In the example shown in FIG. 14, the first related element h-1 selectively indicates one of first identification information "A" and "B".

Then, in the example shown in FIG. 14, if the processing element g1 is focused on, the first related element h1-1 associated with the processing element g1 indicates the first identification information "A". The plurality of first related elements h2-1 to h12-1 associated with the processing elements g2 to g12 excluding the processing element g1 respectively indicate, like the processing element g1, one of the first identification information "A" and "B".

In the example shown in FIG. 14, the second related element h-2 selectively indicates, for example, one of second identification information "C" and "D".

Then, in the example shown in FIG. 14, if the processing element g1 is focused on, the second related element h1-2 associated with the processing element g1 indicates the second identification information "C". The plurality of second related elements h2-2 to h12-2 associated with the processing elements g2 to g12 excluding the processing element g1 respectively indicate, like the processing element g1, one of the second identification information "C" and "D".

Figure 15A:
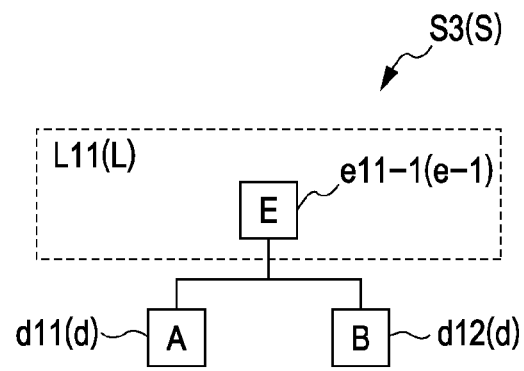
FIG. 15A is a diagram showing an example of first structured information of structured information held by the storage device in the process information structuring support system as the other aspect using the present embodiment.
Figure 15B:
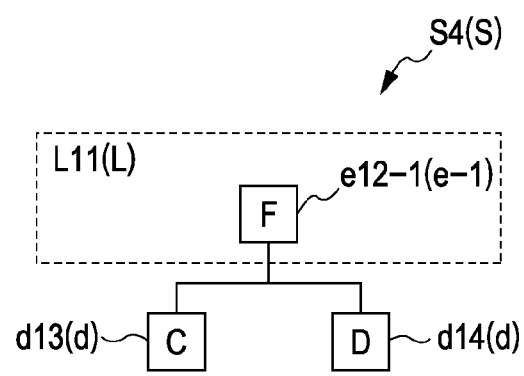
FIG. 15B is a diagram showing an example of second structured information of the structured information held by the storage device in the process information structuring support system as the other aspect using the present embodiment.

FIG. 15A and FIG. 15B are diagrams showing examples of structured information S held by the storage device 12 in the process information structuring support system 10 as the other aspect using the present embodiment. More specifically, FIG. 15A is a diagram showing an example of the first structured information S3 of the structured information S held by the storage device 12 in the process information structuring support system 10 as the other aspect using the present embodiment. FIG. 15B is a diagram showing an example of the second structured information S4 of the structured information S held by the storage device 12 in the process information structuring support system 10 as another aspect of the present embodiment.

In the present embodiment, the storage device 12 holds, for example, the first structured information S3 (See FIG. 15A) in which information about the first related element h-1 is structured and the second structured information S4 (See FIG. 15B) in which information about the second related element h-2 is structured as the structured information S.

When it is necessary to identify one of the first structured information and the second structured information, the numeral S3 or S4 is used as a numeral below to indicate the structured information, but the numeral S is used when any one or a plurality of pieces of structured information is indicated.

The structured information S includes, for example, like the above embodiment, a plurality of structuring related elements d and a classification element group L for hierarchically classifying the plurality of structuring related elements d.

In the first structured information S3 shown in FIG. 15A, for example, a plurality of structuring related elements d11 and d12 indicates the element names "A" and "B" corresponding to the first related element h-1 respectively.

In the second structured information S4 shown in FIG. 15B, for example, a plurality of structuring related elements d13 and d14 indicates the element names "C" and "D" corresponding to the second related element h-2 respectively.

When it is necessary to identify one of the plurality of structuring related elements, the numeral d11 to d14 are used as a numeral below to indicate the structuring related element, but the numeral d is used when any one or a plurality of structuring related elements is indicated.

As shown, for example, in FIG. 15A and FIG. 15B, the classification element group L has a first-layer classification element group L11. In the present embodiment, the first-layer classification element group L11 is the top layer.

The first-layer classification element group L11 includes the first classification element (classification element) e-1.

In the first structured information S3 shown in FIG. 15A, for example, a first classification element e11-1 constituting the first-layer classification element group L11 indicates the element name "E".

In the second structured information S4 shown in FIG. 15B, for example, a first classification element e12-1 constituting the first classification element group L11 indicates the element name "F".

When it is necessary to identify one of the plurality of first classification elements, the numeral ell-1 or e12-1 is used as a numeral below to indicate the first classification element, but the numeral e-1 is used when any one or plurality of first classification elements is indicated.

Figure 16:
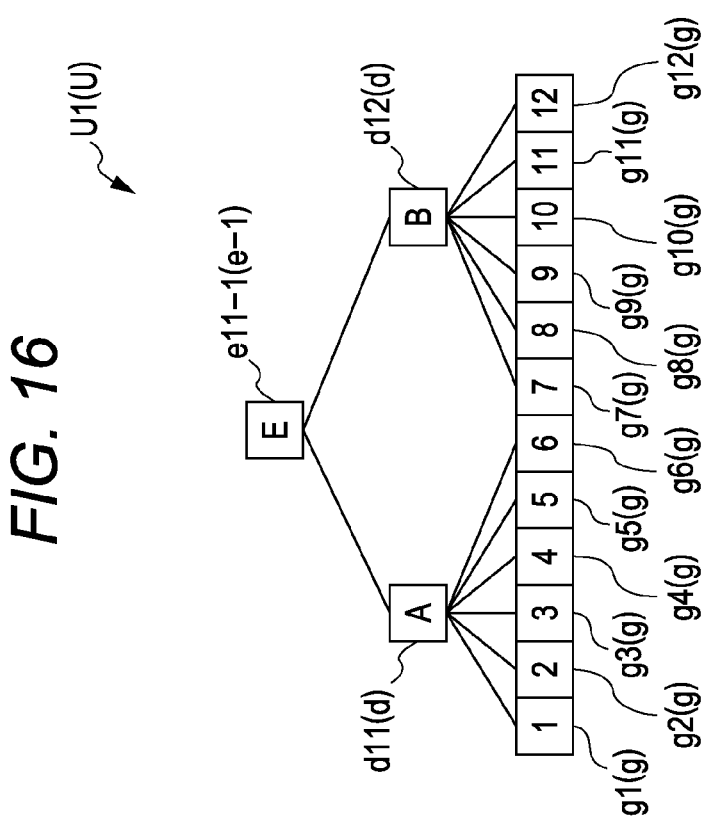
FIG. 16 is a diagram showing an example of a data structure of first structured process information generated by the generation part in the process information structuring support system as the other aspect using the present embodiment.
Figure 17:
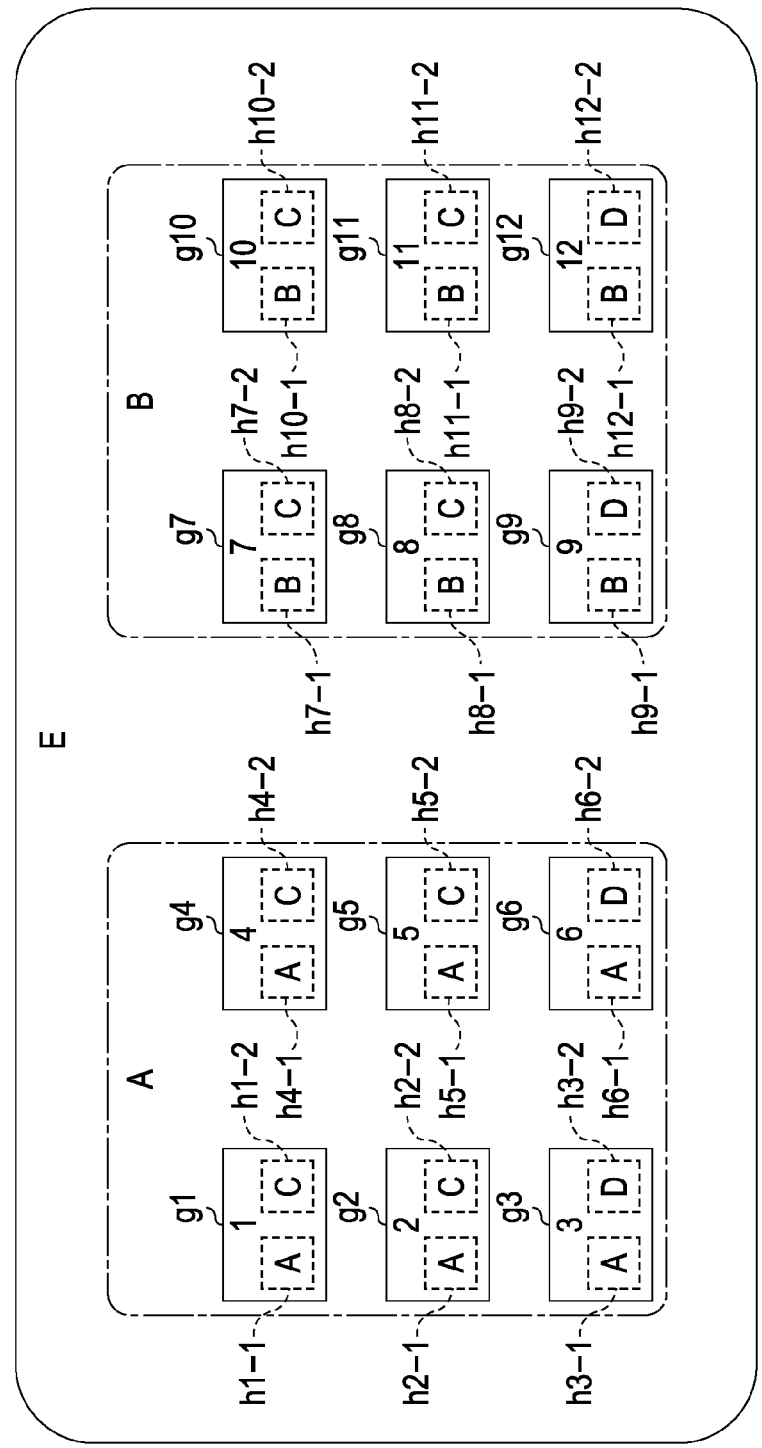
FIG. 17 is a diagram showing an example of a GUI display image of the first structured process information generated by the generation part in the process information structuring support system as the other aspect using the present embodiment.
Figure 18:
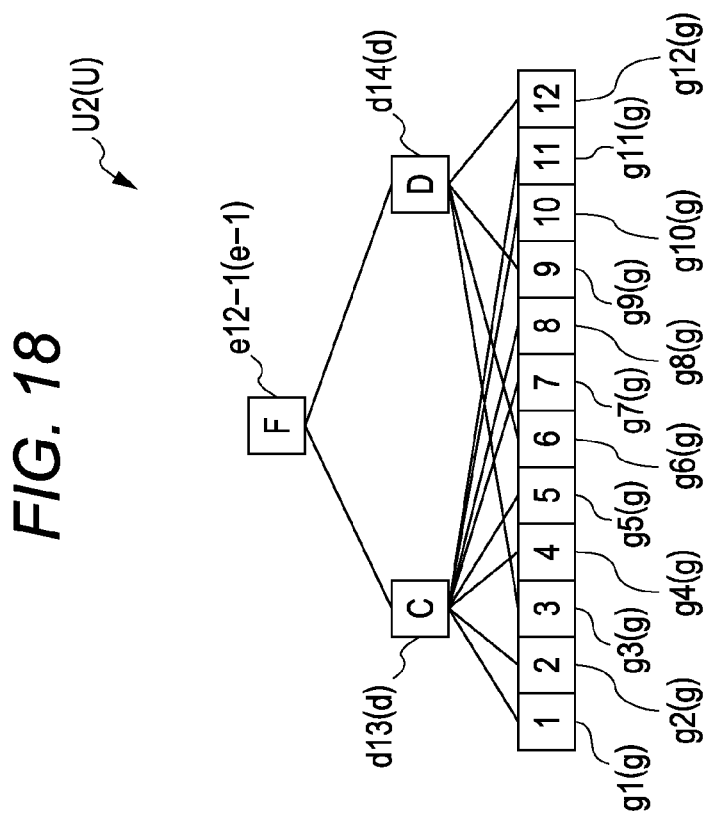
FIG. 18 is a diagram showing an example of the data structure of second structured process information generated by the generation part in the process information structuring support system as the other aspect using the present embodiment.
Figure 19:
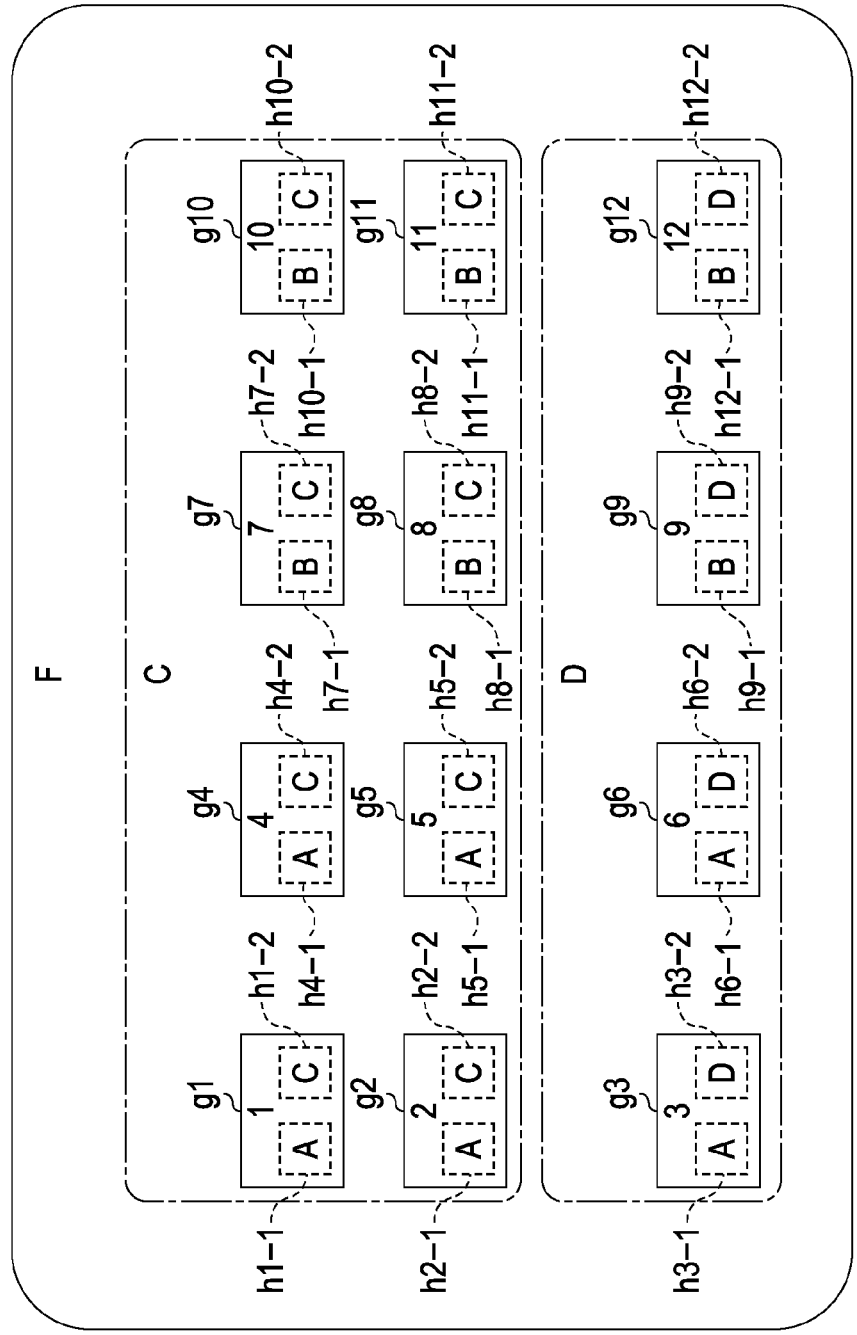
FIG. 19 is a diagram showing an example of the GUI display image of the second structured process information generated by the generation part in the process information structuring support system as the other aspect using the present embodiment.

FIG. 16 to FIG. 19 are diagrams exemplarily showing examples of structured process information U generated by the generation part 26 in the process information structuring support system 10 as another aspect of the present embodiment. FIG. 16 is a diagram showing an example of the data structure of first structured process information U1. FIG. 17 is a diagram showing an example of the GUI display image of the first structured process information U1. FIG. 18 is a diagram showing an example of the data structure of second structured process information U2. FIG. 19 is a diagram showing an example of the GUI display image of the second structured process information U2.

Like the above embodiment, the generation part 26 generates the structured process information U by grouping (structuring) the plurality of processing elements g1 to g12 of structuring target information generated by the processing part 25.

In the example shown in FIG. 16 and FIG. 17, the generation part 26 groups the processing elements g1 to g6 whose first related element h-1 indicates the first identification information "A". The generation part 26 also groups the processing elements g7 to g12 whose first related element h-1 indicates the first identification information "B".

Then, the generation part 26 groups the structuring related elements d11 and d12 indicating the element names "A" and "B" belonging to the first classification element e-1 indicating the element name "E".

Accordingly, the generation part 26 generates the first structured process information U1 (structured process information U) in which the plurality of processing elements g1 to g12 of structuring target information is structured according to the first structured information S3.

Since the first-layer classification element group L1 is the top layer in the present embodiment, the generation part 26 terminates generation of the first structured process information U1.

In the example shown in FIG. 18 and FIG. 19, the generation part 26 groups the processing elements g1, g2, g4, g5, g7, g8, g10, and g11 whose second related element h-2 indicates the second identification information "C". The generation part 26 also groups the processing elements g3, g6, g9, and g12 whose second related element h-2 indicates the second identification information "D".

Then, the generation part 26 groups the structuring related elements d13 and d14 indicating the element names "C" and "D" belonging to the first classification element e-1 indicating the element name "F".

Accordingly, the generation part 26 generates the second structured process information U2 (structured process information U) in which the plurality of processing elements g1 to g12 of structuring target information is structured according to the second structured information S4.

If the first related element h-1 in the process information R is an unspecified related element x, like the above embodiment, the generation part 26 structures the processing element a associated with the unspecified related element x in accordance with a specified element (additional information) added by the processing part 25.

Figure 20:
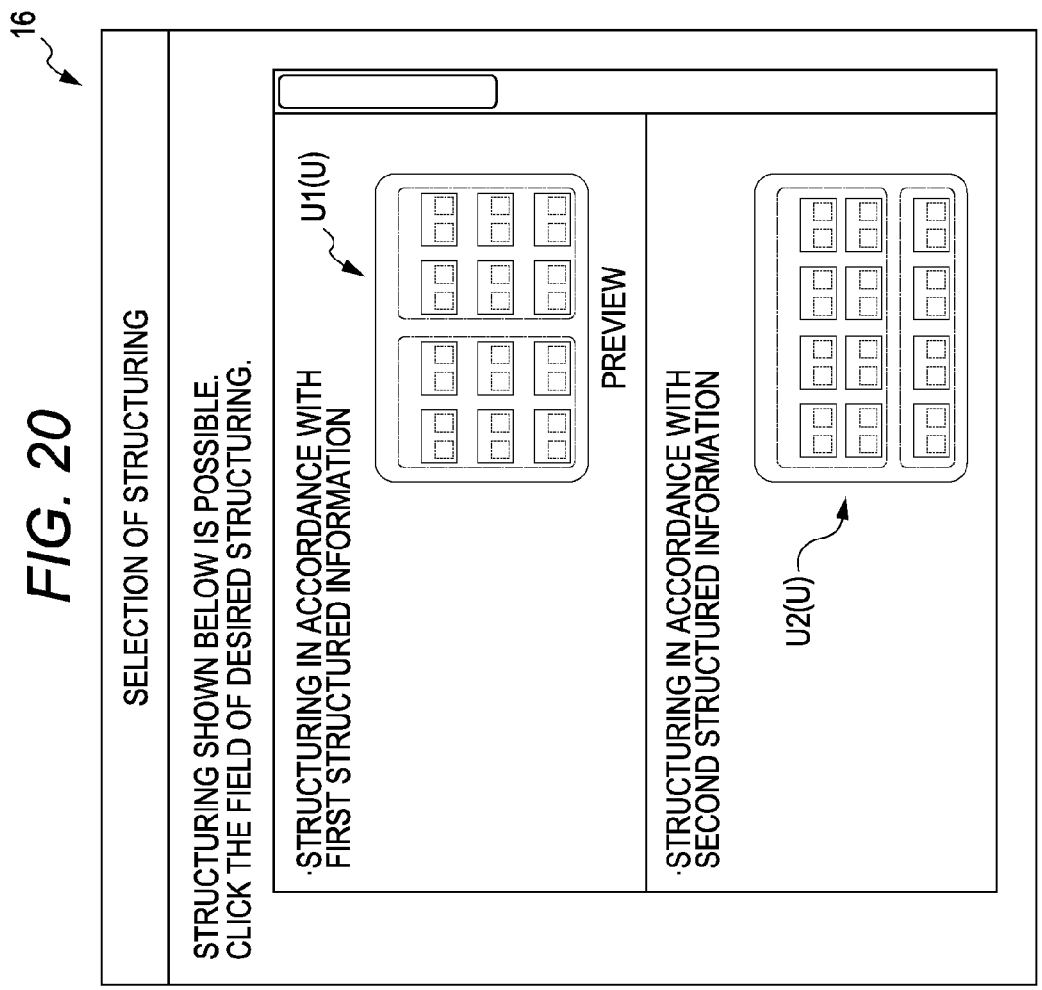
FIG. 20 is a diagram showing an example of the selection screen displayed in the display part in the process information structuring support system as the other aspect using the present embodiment.

FIG. 20 is a diagram showing an example of the selection screen of the first structured process information U1 and the second structured process information U2 displayed in the display part 16 in the process information structuring support system 10 as another aspect of the present embodiment.

Like the above embodiment, the display part 16 displays, as shown in FIG. 20, a plurality of (two in the present embodiment) pieces of structured process information U1 and U2 generated by the generation part 26 side by side.

Like the above embodiment, the selection part 28 selects, after input by a user, one of the plurality of pieces of structured process information U1 and U2 displayed in the display part 16, and selects structured process information obtained by structuring the selected structured process information as selected structured process information.

Then, like the above embodiment, the generation part 26 further structures the selected structured process information selected by the selection part 28 in accordance with non-selected structured information not selected by the selection part 28.

Figure 21:
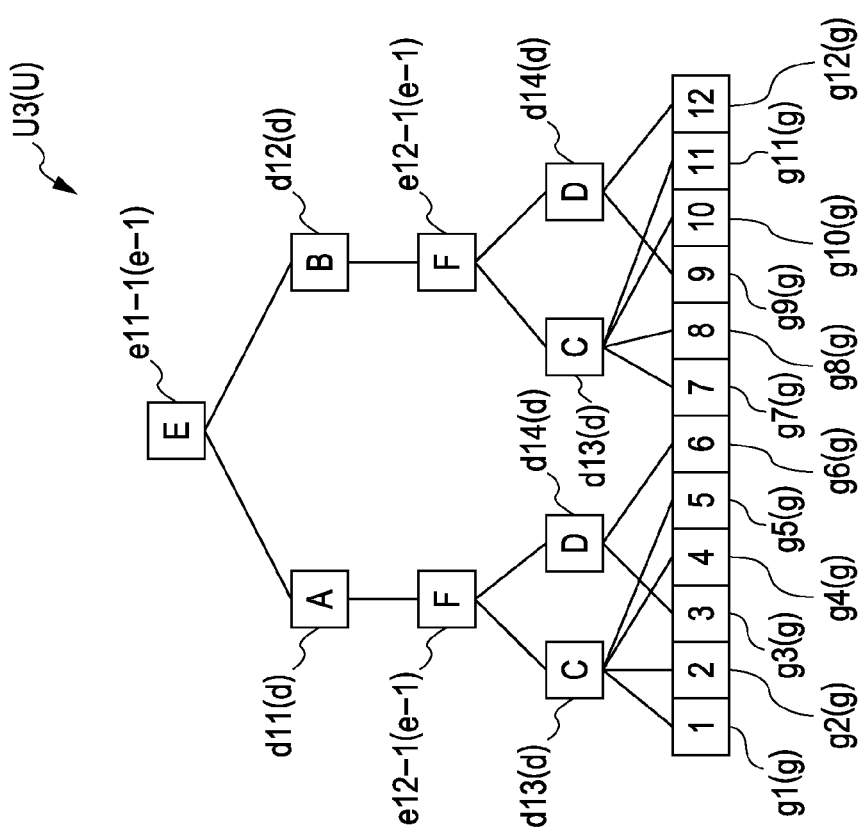
FIG. 21 is a diagram showing an example of the data structure of third structured process information generated by the generation part in the process information structuring support system as the other aspect using the present embodiment.
Figure 22:
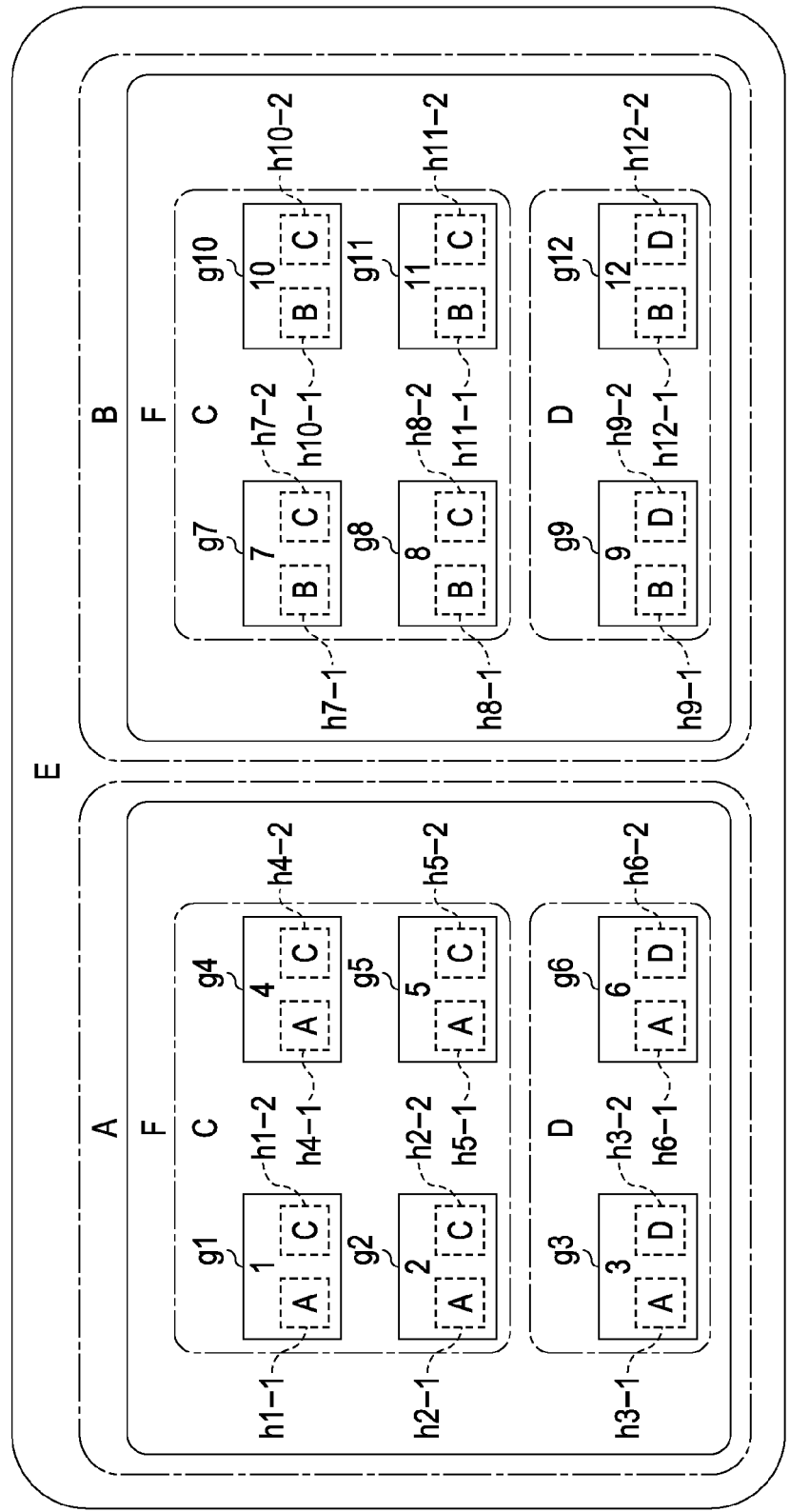
FIG. 22 is a diagram showing an example of the GUI display image of the third structured process information generated by the generation part in the process information structuring support system as the other aspect using the present embodiment.
Figure 23:
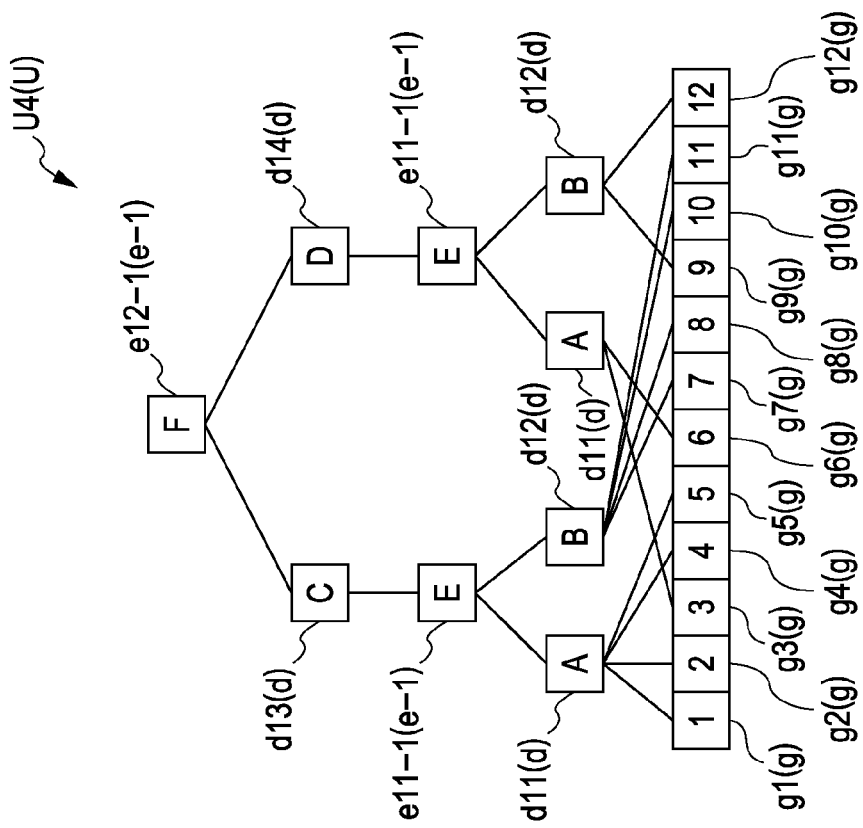
FIG. 23 is a diagram showing an example of the data structure of fourth structured process information generated by the generation part in the process information structuring support system as the other aspect using the present embodiment.
Figure 24:
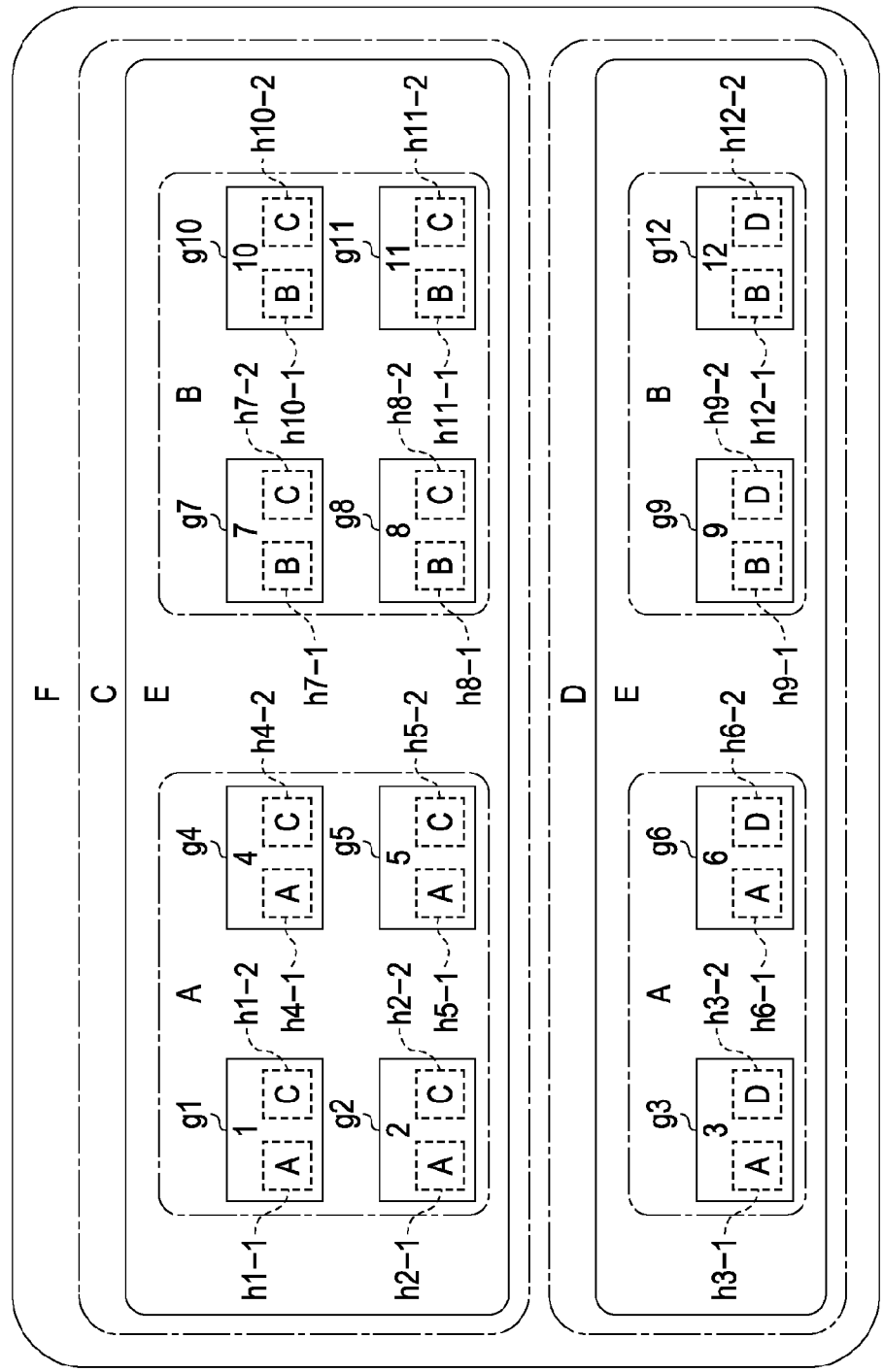
FIG. 24 is a diagram showing an example of the GUI display image of the fourth structured process information generated by the generation part in the process information structuring support system as the other aspect using the present embodiment.

FIG. 21 to FIG. 24 are diagrams exemplarily showing examples of the structured process information U generated by the generation part 26 in the process information structuring support system 10 as another aspect of the present embodiment. FIG. 21 is a diagram showing an example of the data structure of third structured process information U3. FIG. 22 is a diagram showing an example of the GUI display image of the third structured process information U3. FIG. 23 is a diagram showing an example of the data structure of fourth structured process information U4. FIG. 24 is a diagram showing an example of the GUI display image of the fourth structured process information U4.

If, for example, the first structured process information U1 is selected as the selected structured process information, the generation part 26 further structures the selected structured process information U1 in accordance with the non-selected structured information S4 in a group structured in accordance with the first structured information S3.

More specifically, as shown in FIG. 21 and FIG. 22, the generation part 26 further groups the processing elements g1, g2, g4, and g5 whose second related element h-2 indicates the second identification information "C" in a group formed by the processing elements g1 to g6, whose first related element h-1 indicates the first identification information "A". Also, the generation part 26 further groups the processing elements g3 and g6 whose second related element h-2 indicates the second identification information "D" in a group formed by the processing elements g1 to g6, whose first related element h-1 indicates the first identification information "A". Then, the generation part 26 further groups the structuring related elements d indicating the element names "C" and "D" belonging to the first classification element e-1 indicating the element name "F" in a group formed by the processing elements g1 to g6 whose first related element h-1 indicates the first identification information "A".

Similarly, the generation part 26 further groups the processing elements g7, g8, g10, and g11 whose second related element h-2 indicates the second identification information "C" in a group formed by the processing elements g7 to g12, whose first related element h-1 indicates the first identification information "B". Also, the generation part 26 further groups the processing elements g9 and g12, whose second related element h-2 indicates the second identification information "D", in a group formed by the processing elements g7 to g12, whose first related element h-1 indicates the first identification information "B". Then, the generation part 26 further groups the structuring related elements d, indicating the element names "C" and "D" belonging to the first classification element e-1 indicating the element name "F", in a group formed by the processing elements g7 to g12, whose first related element h-1 indicates the first identification information "B".

Accordingly, the generation part 26 generates the third structured process information U3 (structured process information U) obtained by further structuring the selected structured process information U1 in accordance with the non-selected structured information S4.

If, for example, the second structured process information U2 is selected as the selected structured process information, the generation part 26 further structures the selected structured process information U2 in accordance with the non-selected structured information S3, in a group structured in accordance with the second structured information S4.

More specifically, as shown in FIG. 23 and FIG. 24, the generation part 26 further groups the processing elements g1, g2, g4, and g5, whose first related element h-1 indicates the first identification information "A", in a group formed by the processing elements g1, g2, g4, g5, g7, g8, g10, and g11, whose second related element h-2 indicates the second identification information "C". Also, the generation part 26 further groups the processing elements g7, g8, g10, and g11, whose first related element h-1 indicates the first identification information "B", in a group formed by the processing elements g1, g2, g4, g5, g7, g8, g10, and gill, whose second related element h-2 indicates the second identification information "C". Then, the generation part 26 further groups the structuring related elements d indicating the element names "A" and "B", belonging to the first classification element e-1 indicating the element name "E", in a group formed by the processing elements g1, g2, g4, g5, g7, g8, g10, and g11, whose second related element h-2 indicates the second identification information "C".

Similarly, the generation part 26 further groups the processing elements g3 and g6, whose first related element h-1 indicates the second identification information "A", in a group formed by the processing elements g3, g6, g9 and g12, whose second related element h-2 indicates the second identification information "D". Also, the generation part 26 further groups the processing elements g9 and g12, whose first related element h-1 indicates the first identification information "B", in a group formed by the processing elements g3, g6, g9 and g12, whose second related element h-2 indicates the second identification information "D". Then, the generation part 26 further groups the structuring related elements d, indicating the element names "A" and "B" belonging to the first classification element e-1 indicating the element name "E", in a group formed by the processing elements g3, g6, g9 and g12, whose second related element h-2 indicates the second identification information "D".

Accordingly, the generation part 26 generates the fourth structured process information U4 (structured process information U) obtained by further structuring the selected structured process information U2 in accordance with the non-selected structured information S3.

Therefore, the generation part 26 generates the structured process information U by structuring the plurality of processing elements g1 to g12 in accordance with selected structured information selected by the selection part 28 and then, further structuring the processing elements g1 to g12 in accordance with non-selected structured information not selected by the selection part 28.

Figure 25:
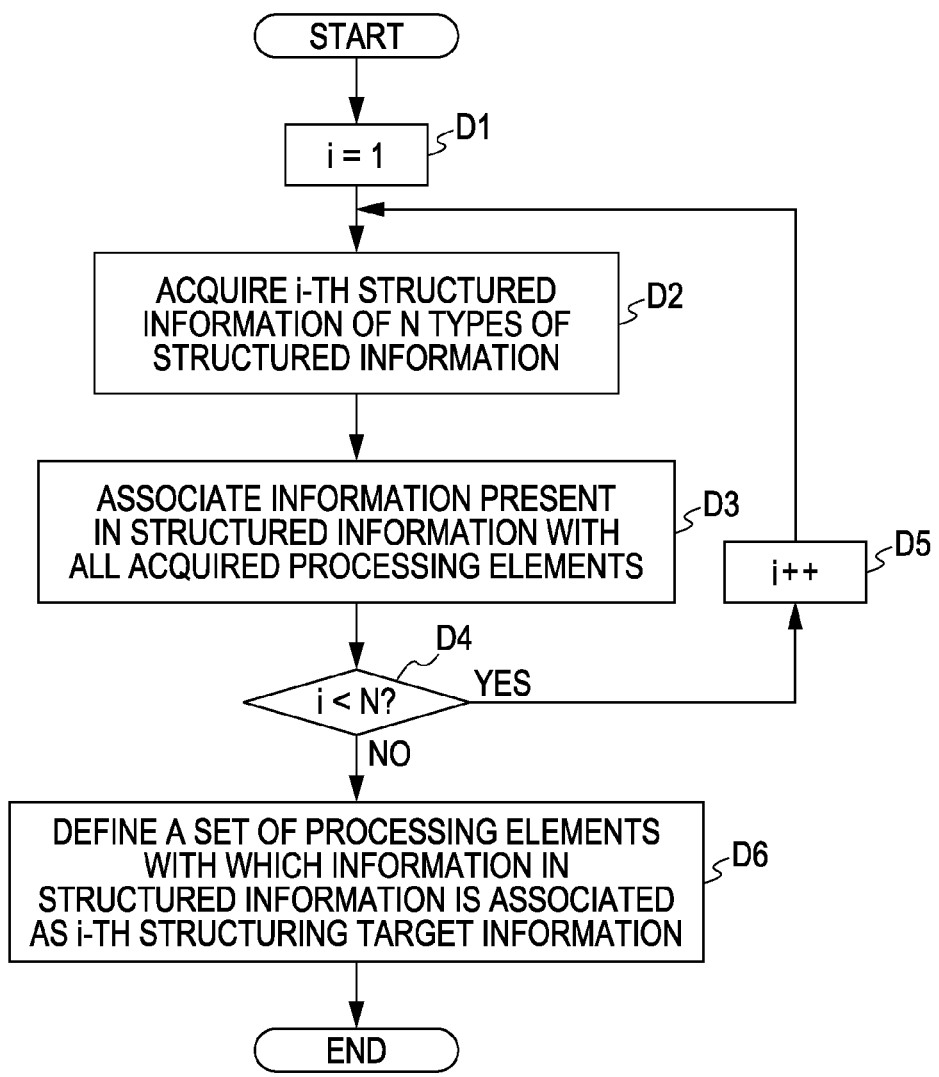
FIG. 25 is a flow chart showing an example of a generation technique of structuring target information in the process information structuring support system as the other aspect using the present embodiment.

An example of the generation technique of structured target information in the process information structuring support system 10 according to the other aspect using the present embodiment configured as described above will be described following a flow chart (step D1 to step D6) shown in FIG. 25.

First, a variable i is set to value "1" (step D1). The first acquisition part 22 acquires the process information R (first acquisition step).

Next, the second acquisition part 23 acquires the i-th structured information of a plurality of types of (N types; N is a natural number; two in the present embodiment) structured information (in the present embodiment, the first structured information S3 and the second structured information S4) held in the storage device 12 (step D2; second acquisition step). In the present embodiment, the first structured information is the first structured information S3 and the second structured information is the second structured information S4.

Then, the processing part 25 associates the classification element e present in the i-th structured information S with each of all processing elements g1 to g12 acquired by the first acquisition part 22 (step D3; processing step).

Subsequently, whether the value of the variable i is smaller than the value N indicating the number of types of structured information is determined (step D4).

If the value of the variable i is determined to be smaller than N (See "YES" route at step D4), the value "1" is added to the variable i (step D5) before proceeding to step D2.

On the other hand, if the value of the variable i is determined not to be smaller than N (See "NO" route at step D4), the processing part 25 generates a set of the processing elements g1 to g12 with which the classification element e present in the i-th structured information S is associated as the i-th structuring target information (step D6) before terminating processing.

Accordingly, in the present embodiment, the processing part 25 generates the first structuring target information in which the classification element e present in the first structured information S3 is associated with the processing elements g1 to g12, and the second structuring target information in which the classification element e present in the second structured information S4 is associated with the processing elements g1 to g12.

Next, an example of the generation technique of the structured process information U1 and U2 in the process information structuring support system 10 according to another aspect of the present embodiment will be described following a flow chart (step E1 to step E8) shown in FIG. 26.

First, the variable i is set to the value "1" (step E1).

Next, the second acquisition part 23 acquires the i-th structured information of a plurality of types of (N types; N is a natural number; two in the present embodiment) structured information (in the present embodiment, the first structured information S3 and the second structured information S4) (step E2; second acquisition step). In the present embodiment, the first structured information is the first structured information S3 and the second structured information is the second structured information S4.

Then, the generation part 26 generates the i-th structured process information U by grouping (structuring) the processing elements g1 to g12 based on the i-th structuring target information and the i-th structured information S (step E3; generation step). In this case, the generation part 26 groups the processing elements g1 to g12 until there is no upper layer of the i-th structured information S.

The generation part 26 also determines whether or not the processing elements g1 to g12 can be grouped such as when there is no upper layer of the i-th structured information S (step E4). That is, the generation part 26 determines whether grouping is possible for some piece of processing or an upper group thereof with the i-th structured information S.

If grouping is determined to be possible (See "NO" route at step E4), the generation part 26 determines whether the generated i-th structured process information U is identical or substantially identical to any of the first to (i-1)-th generated structured process information U (step E5).

If the i-th structured process information U is determined to be different from the first to (i-1)-th structured process information U (See "NO" route at step E5), the generation part 26 stores the generated i-th structured process information U in the HDD 19 as a grouping result (step E6).

If grouping is determined to be impossible (See "YES" route at step E4) or the i-th structured process information U is determined to be identical or substantially identical to one of the first to (i-1)-th structured process information U (See "YES" route at step E5), processing proceeds to step E7.

Subsequently, whether the value of the variable i is smaller than the value N indicating the number of types of structured information S acquired by the second acquisition part 23 is determined (step E7).

If the value of the variable i is determined to be smaller than N (See "YES" route at step E7), the value "1" is added to the variable i (step E8) before proceeding to step E2.

On the other hand, if the value of the variable i is determined not to be smaller than N (See "NO" route at step E7), processing is terminated.

Accordingly, in the present embodiment, the generation part 26 generates the first structured process information U1 in which the processing elements g1 to g12 are structured in accordance with the first structured information S3 and the second structured process information U2 in which the processing elements g1 to g12 are structured in accordance with the second structured information S4.

Figure 27:
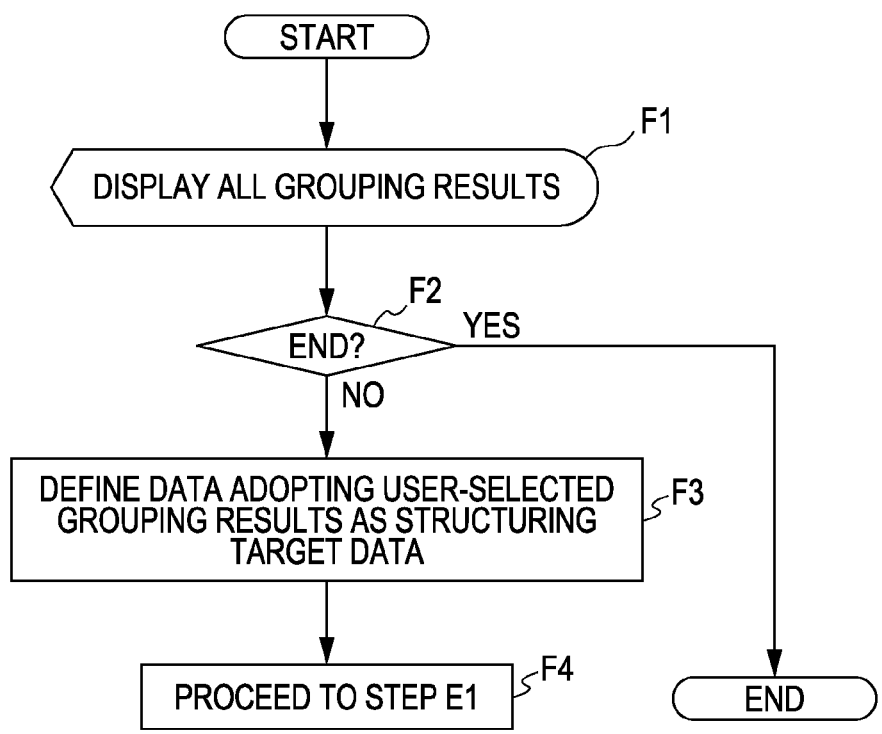
FIG. 27 is a flow chart showing an example of the generation technique of structured process information in the process information structuring support system as the other aspect using the present embodiment.

Next, an example of the generation technique of the structured process information U3 and U4 in the process information structuring support system 10 according to the other aspect using the present embodiment will be described following a flow chart (step F1 to step F4) shown in FIG. 27.

First, the display part 16 displays the first structured process information U1 and the second structured process information U2 output from the output part 27 side by side (step F1; output step; display step). That is, the process information structuring support system 10 is in a wait state until a user makes a selection.

The user references the first structured process information U1 and the second structured process information U2 displayed in the display part 16 and then determines whether to terminate processing (step F2) and, if the user determines to terminate processing (See "YES" route at step F2), processing is terminated.

If, on the other hand, the user determines to continue processing (See "NO" route at step F2), the selection part 28 selects one of the first structured process information U1 and the second structured process information U2 displayed in the display part 16 based on input by the user as selected structured process information (selection step).

Figure 26:
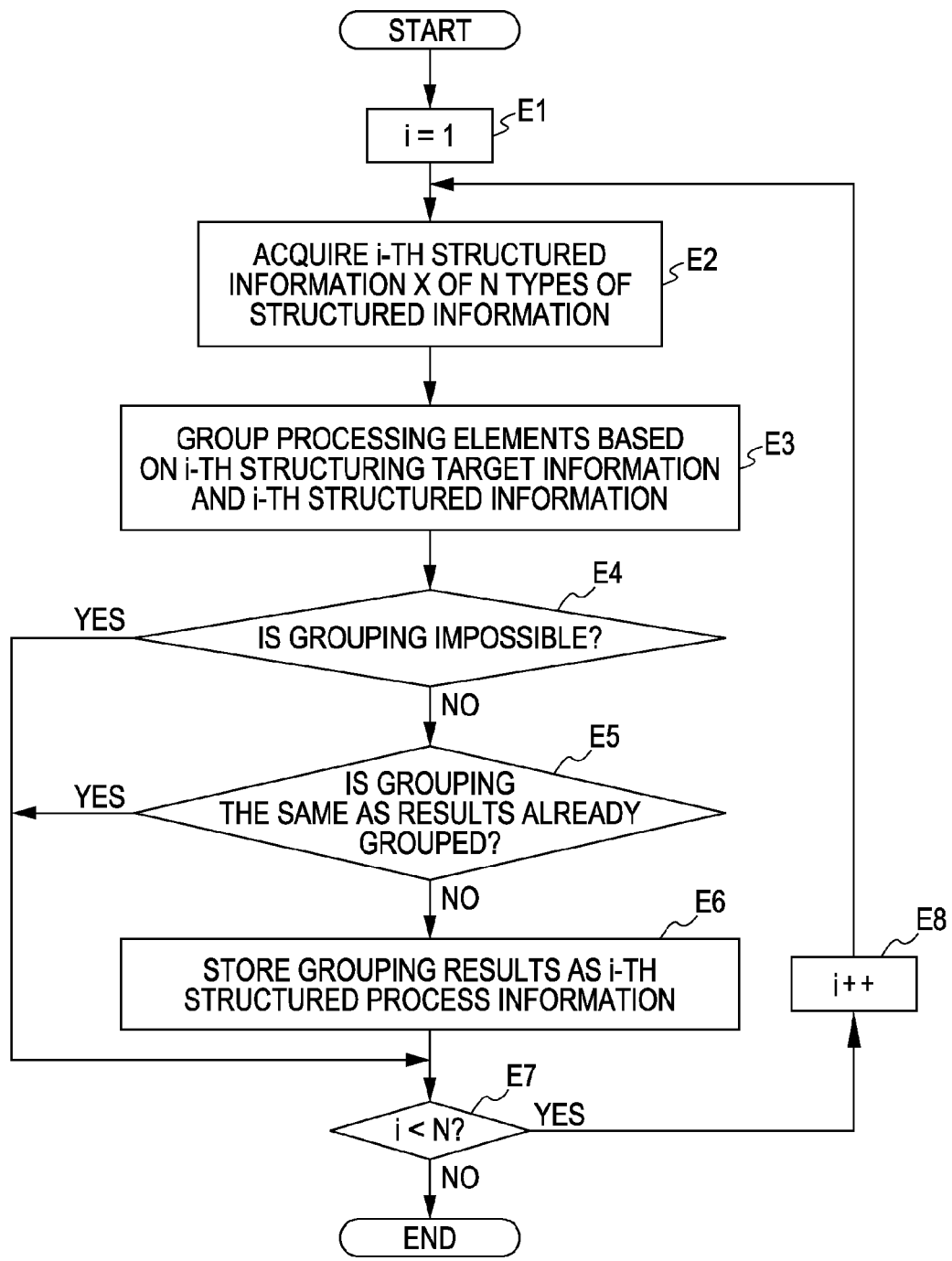
FIG. 26 is a flow chart showing an example of the generation technique of structured process information in the process information structuring support system as the other aspect using the present embodiment.

Then, the selected structured process information is considered to be structuring target information (step F3) before proceeding to step E1 in FIG. 26 (step F4) to repeat steps E1 to E8 described above.

Accordingly, the generation part 26 generates the third structured process information U3 obtained by further structuring the selected structured process information U1 in accordance with the non-selected structured information S4 and the fourth structured process information U4 obtained by further structuring the selected structured process information U2 in accordance with the non-selected structured information S3.

Thus, the same operation effects as those of the above embodiment can be obtained by the process information structuring support system 10 according to the other aspect of the present embodiment.

[3] Others

The present invention is not limited to the above embodiments and various modifications thereof can be made without deviating from the spirit of the present invention.

In the above embodiments, for example, the executor structured information S1 and the business service structured information S2 are used as examples of structured information, but structured information is not limited to S1 and S2 and various types of information can be used as structured information. For example, incident management structured information S5 can be used as structured information.

In this case, for example, the generation part 26 references work content of incident management/change management of ITIL (Information Technology Infrastructure Library) to form groups with the same work content.

An example of generating structured process information by using the incident management structured information S5 as structured information will be described below.

When the incident management structured information S5 is used as structured information, the process information P (See FIG. 2) has incident management information (not shown) related to the processing element a as one of the related elements c.

Incident management information shows incident identification information regarding work content such as (ITIL) incident management/change management when the processing element a fails. More specifically, incident management information shows predefined incident identification information such as "Incident detection and recording", "Classification and initial support", "Investigation and diagnosis" and the like.

In the example using the process information P shown in FIG. 2, incident management information showing any one or a plurality of pieces of incident identification information is attached to each of the plurality of processing elements a1 to a14.

Figure 28:
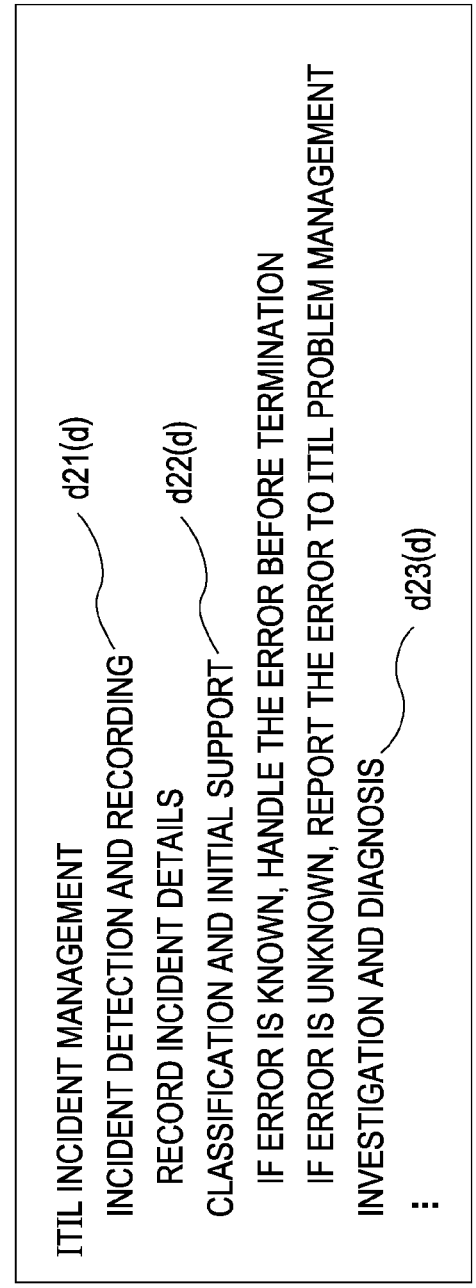
FIG. 28 is a diagram showing an example of incident management structured information held by the storage device in the process information structuring support system as a modification of the present embodiment.

FIG. 28 is a diagram showing an example of the incident management structured information S5 held by the storage device 12 in the process information structuring support system 10 as a modification of the present embodiment.

When the incident management structured information S5 is used as structured information, the storage device 12 holds the incident management structured information S5 (not shown).

The incident management structured information S5 includes, as shown, for example, in FIG. 28, a plurality of structuring related elements d21 to d23.

In the example shown in FIG. 28, the plurality of structuring related elements d21, d22, and d23 shows element names "Incident detection and recording", "Classification and initial support", and "Investigation and diagnosis" respectively.

In the example using the process information P shown in FIG. 2, the processing part 25 performs processing to attach the structuring related element d contained in the incident management structured information S5 acquired by the second acquisition part 23 to each of the plurality of processing elements a1 to a14 contained in the process information P acquired by the first acquisition part 22 as additional information.

More specifically, the processing part 25 identifies one or a plurality of matching structuring related elements d contained in each piece of the incident management information from the incident management structured information S5. Then, the processing part 25 acquires the identified one or the plurality of structuring related elements d for each piece of the incident management information from the incident management structured information S5. Subsequently, the processing part 25 performs processing to attach one or the plurality of structuring related elements d acquired for each of the plurality of processing elements a1 to a14 to each of the plurality of processing elements a1 to a14 as additional information. Accordingly, the processing part 25 generates structuring target information in which one or the plurality of structuring related elements d is attached to each of the plurality of processing elements a1 to a14 as additional information.

Subsequently, in the example using the process information P shown in FIG. 2, the generation part 26 generates structured process information Q by structuring the plurality of processing elements a1 to a14 in the structuring target information generated by the processing part 25 in accordance with the incident management structured information S5 acquired by the second acquisition part 23.

More specifically, the generation part 26 first references one or the plurality of structuring related elements d (additional information) attached to each of the processing elements a1 to a14 of the structuring target information to generate primary structured process information by grouping the processing elements whose element name matches (for example, the structuring related element d21). Next, the generation part 26 references one or the plurality of structuring related elements d (additional information) attached to each of the processing elements a1 to a14 of the primary structured process information to generate secondary structured process information by grouping the processing elements whose element name matches (for example, the structuring related element d22) within a group of the primary structured process information. Then, the generation part 26 references one or the plurality of structuring related elements d (additional information) attached to each of the processing elements a1 to a14 of the secondary structured process information, to generate tertiary structured process information by grouping the processing elements whose element name matches (for example, the structuring related element d23) within a group of the secondary structured process information.

If there is any other structuring related element d attached to each of the processing elements a1 to a14, in addition to the above structuring related elements d21 to d23, the generation part 26 continues to generate structured process information until the other structuring related elements d are used up for grouping.

Therefore, the generation part 26 references one or the plurality of structuring related elements d (additional information) attached to each of the processing elements a1 to a14 of the m (m is a natural number)-th order structured process information to successively generate the (m+1)-th order structured process information by grouping the processing elements whose element name matches (for example, the structuring related element d23) within a group of the m-th order structured process information.

In the above embodiments, the structured information S is held in the storage device 12, but the present invention is not limited to this and the structured information S may be contained in the information processing device 13 or the process information generation device 11 shown in FIG. 1 or held in an external local storage device (for example, the HDD 19).

Further, in the above embodiments, the process information generation device 11 generates the process information P and R, but the present invention is not limited to this and, for example, the information processing device 13 shown in FIG. 1 may have the function to generate process information P and R.

Then, when the CPU 15 or the process information generation device 11 executes a process information structuring support program, the first acquisition part 22, the second acquisition part 23, the estimation part 24, the processing part 25, the generation part 26, and the output part 27 will perform various functions.

The program (process information structuring support program) to realize each of the functions of the first acquisition part 22, the second acquisition part 23, the estimation part 24, the processing part 25, the generation part 26, and the output part 27 is provided in a form of a computer readable recording medium such as a flexible disk, CD (such as CD-ROM, CD-R, and CD-RW), DVD (such as DVD-ROM, DVD-RAM, DVD-R, DVD+R, DVD-RW, DVD+RW, HD-DVD, and blue-ray disk), magnetic disk, optical disk, and magneto-optical disk in which the program is recorded. Then, the computer reads the program from the recording medium to transfer the program to an internal storage device or an external storage device for storage. Or, the program may be provided to the computer via a communication path from a storage device (recording medium) such as a magnetic disk, optical disk, and magneto-optical disk after storing the program in the storage device.

The program stored in the internal storage device is executed by the microprocessor of the computer when each of the functions of the first acquisition part 22, the second acquisition part 23, the estimation part 24, the processing part 25, the generation part 26, and the output part 27 is realized. At this point, the computer may read the program recorded in a recording medium before executing the program.

In the present embodiment, the computer is a concept including hardware and an operating system and means hardware operating under the control of the operating system. If the operating system is not needed and an application program alone operates hardware, the hardware itself corresponds to a computer. Hardware includes at least a microprocessor such as a CPU and a means for reading computer programs recorded in a recording medium and in the present embodiment, the CPU 15 and the process information generation device 11 have the function as a computer.

Further, in addition to the flexible disk, CD, DVD, magnetic disk, optical disk, and magneto-optical disk described above, various kinds of computer readable media such as an IC card, ROM cartridge, magnetic tape, punched card, internal storage device (memory of RAM, ROM and the like) of the computer, external storage device, and printed matter on which code such as bar code is printed can be used as a recording media in this embodiment.

According to the embodiments disclosed above, at least one of the effects or advantages below can be achieved:

(1) Since process information can automatically be structured, an enormous amount of man-hours needed for structuring of the process information can significantly be reduced.

(2) Structuring in a natural form of process information can easily be realized.

(3) By combining a plurality of types of structured information to supplement information that is unknown from single structured information, types of structured process information can be widened to enable appropriate structuring of process information.

(4) Understanding and reviews of the structure of structured process information can be made easier even for a person without skills.

(5) The user can structure process information as desired by the user while checking results of the structured process information.

The invention claimed is:

1. A process information structuring support method, to be executed by a CPU, the process information structuring support method comprising:
   acquiring a process information showing a flow of a plurality of processing elements and containing a plurality of related elements associated with the plurality of processing elements, respectively, wherein the related elements include first related elements and second related elements, where the second related elements are of a different type than the first related elements;
   acquiring structured information obtained by grouping information about the plurality of related elements, wherein the structured information includes first structured information in which information about a plurality of the first related elements is grouped and second structured information in which information about a plurality of the second related elements is grouped;
   estimating, when the first related element is an unknown related element in the process information, the unknown related element as a specified related element contained in the first structured information based on the processing element associated with the unknown related element and the second structured information;
   generating structured process information by grouping the plurality of processing elements in the acquired process information in accordance with the acquired structured information, wherein the structured process information is generated by grouping the plurality of processing elements in accordance with the estimated specified element and the acquired structured information, when estimating the unknown related element as the specified related elements; and
   outputting the generated structured process information, and
   wherein the estimating includes:
   acquiring a terminal information about an execution terminal used for execution of the processing element from the process information, wherein the terminal information comprises an IP address and account information,
   acquiring a business service information associated with the processing element from the process information,
   identifying the execution terminal from the terminal information and a server to which the execution terminal is coupled, and
   estimating the unknown related element by checking the server, the business service information, the first structured information and the second structured information.

2. The process information structuring support method according to claim 1, the process information structuring support method further comprising:
   displaying the output structured process information in a display part.

3. The process information structuring support method according to claim 1, the process information structuring support method further comprising:
   selecting one of the first structured information and the second structured information as selected structured information,
   wherein the structured process information is generated by grouping the plurality of processing elements in accordance with the selected structured information selected by the selection and then, further grouping the plurality of processing elements in accordance with non-selected structured information not selected by the selection.

4. The information structuring support method according to claim 3, wherein the outputting includes outputting the first structured information and the second structured information with a priority for each of the first structured information and the second structured information.

5. The information structuring support method according to claim 4, wherein the priority is an index quantitatively indicating ease of understanding of the structured information.

6. A non-transitory recording medium recording a process information structuring support program causing a computer to perform a process, the process information structuring support program comprising:
   acquiring the process information showing a flow of a plurality of processing elements and containing a plurality of related elements associated with the plurality of processing elements, respectively, wherein the related elements include first related elements and second related elements, where the second related elements are of a different type than the first related elements;
   acquiring structured information obtained by grouping information about the plurality of related elements, wherein the structured information includes first structured information in which information about a plurality of the first related elements is grouped and second structured information in which information about a plurality of the second related elements is grouped;
   estimating, when the first related element is an unknown related element in the process information, the unknown related element as a specified related element contained in the first structured information based on the processing element associated with the unknown related element and the second structured information;
   generating structured process information by grouping the plurality of processing elements in the acquired process information in accordance with the acquired structured information, wherein the structured process information is generated by grouping the plurality of processing elements in accordance with the estimated specified element and the acquired structured information, when estimating the unknown related element as the specified related elements; and
   outputting the generated structured process information, and
   wherein the estimating includes:
   acquiring a terminal information about an execution terminal used for execution of the processing element from the process information, wherein the terminal information comprises an IP address and account information,
   acquiring a business service information associated with the processing element from the process information,
   identifying the execution terminal from the terminal information and a server to which the execution terminal is coupled, and
   estimating the unknown related element by checking the server, the business service information, the first structured information and the second structured information.

7. The non-transitory recording medium recording a process information structuring support program according to claim 6, the recording medium further comprising:
- selecting one of the first structured information and the second structured information as selected structured information,
- wherein the structured process information is generated by grouping the plurality of processing elements in accordance with the selected structured information selected by the selection and then, further grouping the plurality of processing elements in accordance with non-selected structured information not selected by the selection.

8. An information processing device, including a storage device and a CPU, the information processing device comprising:
- acquiring process information showing a flow of a plurality of processing elements and containing a plurality of related elements associated with the plurality of processing elements, respectively, wherein the related elements include first related elements and second related elements, where the second related elements are of a different type than the first related elements;
- acquiring structured information obtained by grouping information about the plurality of related elements;
- wherein when a first related element in the acquired process information is an unknown related element, estimating the unknown related element as a specified related element contained in the first structured information based on the processing element associated with the unknown related element and the second structured information;
- generating structured process information by grouping the plurality of processing elements in the process information acquired by the acquiring process information in accordance with the structured information acquired by the acquiring structured information, the generating generates the structured process information in accordance with the estimated specified element and the structured information acquired by the acquiring structured information when the estimating estimated the unknown related element as specified related element; and
- outputting the structured process information generated by the generating, and
- wherein the estimating includes:
- acquiring a terminal information about an execution terminal used for execution of the processing element from the process information, wherein the terminal information comprises an IP address and account information,
- acquiring a business service information associated with the processing element from the process information,
- identifying the execution terminal from the terminal information and a server to which the execution terminal is coupled, and
- estimating the unknown related element by checking the server, the business service information, the first structured information and the second structured information.

9. The information processing device according to claim 8, the information processing device further comprising:
- a display part displaying the structured process information output from the output part.

10. The information processing device according to claim 8, the information processing device further comprising:
- selecting one of the first structured information and the second structured information as selected structured information,
- wherein the structured process information is generated by grouping the plurality of processing elements in accordance with the selected structured information selected by the selecting and then, further grouping the plurality of processing elements in accordance with non-selected structured information not selected by the selecting.

11. A process information structuring support system comprising:
- a storage device, and
- a CPU, wherein the CPU executes a process including:
- acquiring a process information showing a flow of a plurality of processing elements and containing a plurality of related elements, each of which is associated with one of the plurality of processing elements, respectively, the related elements including first related elements and second related elements, where the second related elements are of a different type than the first related elements;
- holding structured information in which information about the plurality of related elements is grouped in the storage device, the structured information including first structured information, in which information about the first related elements is grouped, and second structured information, in which information about the second related elements is grouped in the storage device;
- when a first related element in the acquired process information is an unknown related element, estimating the unknown related element as a specified related element contained in the first structured information based on the processing element associated with the unknown related element and the second structured information;
- generating structured process information by grouping the plurality of processing elements in the acquired process information in accordance with the structured information, and generating the structured process information in accordance with the estimated specified element and the structured information when the estimation unknown related element is estimated as specified related element; and
- outputting the structured process information, and
- wherein the estimating includes:
- acquiring a terminal information about an execution terminal used for execution of the processing element from the process information, wherein the terminal information comprises an IP address and account information,
- acquiring a business service information associated with the processing element from the process information,
- identifying the execution terminal from the terminal information and a server to which the execution terminal is coupled, and
- estimating the unknown related element by checking the server, the business service information, the first structured information and the second structured information.

12. The process information structuring support system according to claim 11, the process information structuring support system further comprising:
- a display part configured to display the structured process information output during the outputting.

13. The process information structuring support system according to claim 11, the process information structuring support system further comprising:
- selecting one of the first structured information and the second structured information as selected structured information,
- wherein the generating involves generating the structured process information by grouping the plurality of processing elements in accordance with the selected structured information selected by the selecting and then, further grouping the plurality of processing elements in accordance with non-selected structured information not selected by the selecting.

* * * * *